US008238382B2

(12) United States Patent
Sugahara

(10) Patent No.: US 8,238,382 B2
(45) Date of Patent: *Aug. 7, 2012

(54) METHOD AND APPARATUS FOR GENERATING INFORMATION SIGNAL TO BE RECORDED

(75) Inventor: Takayuki Sugahara, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 640 days.

This patent is subject to a terminal disclaimer.

(21) Appl. No.: 12/385,940

(22) Filed: Apr. 24, 2009

(65) Prior Publication Data
US 2009/0214183 A1 Aug. 27, 2009

Related U.S. Application Data

(62) Division of application No. 11/700,841, filed on Feb. 1, 2007, now Pat. No. 7,545,835, which is a division of application No. 10/280,011, filed on Oct. 25, 2002, now Pat. No. 7,257,135.

(30) Foreign Application Priority Data

Dec. 26, 2001 (JP) ................................. 2001-394683

(51) Int. Cl.
*H04J 3/04* (2006.01)

(52) U.S. Cl. ...................................................... 370/535

(58) Field of Classification Search .......... 386/354–357, 386/FOR. 197–FOR. 211, FOR. 112–FOR. 128; 370/532–545
See application file for complete search history.

(56) References Cited

U.S. PATENT DOCUMENTS

| | | | |
|---|---|---|---|
| 4,979,052 A | 12/1990 | Matsuta et al. | |
| 4,991,032 A | 2/1991 | Staffer | |
| 5,182,771 A | 1/1993 | Munich et al. | |
| 5,774,623 A | 6/1998 | Maeda et al. | |
| 6,282,366 B1 | 8/2001 | Oguro et al. | |
| 6,526,217 B1 | 2/2003 | Fujinami | |
| 7,257,135 B2 | 8/2007 | Sugahara | |
| 7,289,718 B2 | 10/2007 | Sugahara et al. | |
| 2003/0231870 A1 | 12/2003 | Nagahara et al. | |
| 2006/0077825 A1 | 4/2006 | Nonaka et al. | |
| 2007/0133624 A1 | 6/2007 | Sugahara | |
| 2007/0154183 A1 | 7/2007 | Komi et al. | |

FOREIGN PATENT DOCUMENTS

| | | |
|---|---|---|
| EP | 1130596 | 9/2001 |
| EP | 1316959 | 6/2003 |
| JP | 6-275018 | 9/1994 |
| JP | 11-144378 | 5/1999 |
| JP | 11-298845 | 10/1999 |
| JP | 2000-197005 | 7/2000 |
| WO | WO 99/12165 | 3/1999 |

*Primary Examiner* — Thai Hoang
(74) *Attorney, Agent, or Firm* — Louis Woo

(57) ABSTRACT

A compressively-encoding-resultant video signal resulting from compressively encoding a video signal, a first compressively-encoding-resultant audio signal resulting from compressively encoding a first audio signal having a synchronized relation with the video signal, a reference clock information signal relating to synchronization between the compressively-encoding-resultant video signal and the first compressively-encoding-resultant audio signal, and an indication timing information signal designating an indication timing of the video signal are multiplexed to get an AV multiplexing-resultant signal. A second audio signal is compressively encoded to get a second compressively-encoding-resultant audio signal. A sound-production-timing information signal is added to the second compressively-encoding-resultant audio signal to get a substitution playback audio signal. During playback, the substitution playback audio signal can be reproduced instead of the first audio signal while being synchronous with the video signal. The sound-production-timing information signal responds to the reference clock information signal, and relates to synchronization with the video signal.

2 Claims, 16 Drawing Sheets

GENERAL_IFO table

| Syntax | No. of bits |
|---|---|
| GENERAL_IFO(){ | |
|     system_id | 32 |
|     TMG_IFO_length | 32 |
|     Version | 8 |
|     HDD_number | 8 |
|     num_of_PR_IFO | 8 |
|     num_of_PL_IFO | 8 |
|     start_address_of_PR_IFO | 32 |
|     start_address_of_PL_IFO | 32 |
| } | |

PROG_IFO table

| Syntax | No. of bits |
|---|---|
| PROG_IFO(){ | |
|   Size of PROG_IFO | 32 |
|   PR number | 8 |
|   Playback Time | 32 |
|   Num of INDEX | 8 |
|   Rec Date | 32 |
|   Rec Time | 24 |
|   reserved | 4 |
|   Character Set | 4 |
|   PR test information_size | 8 |
|   for(i=0;i<PR test information_size;i++){ | |
|     PR_test_information<br>  } | 8 |
|   Content type | 8 |
|   Component type | 8 |
|   V_ATR | 16 |
|   A_ATR | 16 |

FIG. 15

PLAYL_IFO table

| Syntax | No. of bits |
|---|---|
| PLAYL_IFO(){ | |
|    Size of PLAYL_IFO | 32 |
|    PL number | 8 |
|    Playback Time | 32 |
|    PR_number | 8 |
|    AF_number | 8 |
|    Making_Date | 32 |
|    Making_Time | 24 |
|    reserved | 8 |
|    Character Set | 4 |
|    PL test information_size | 8 |
|    for(i=0;i<PR test information_size;i++){ | |
|      PL_test_information | 8 |
|    } | |

FIG. 16

INDEX_IFO table

| Syntax | No. of bits |
|---|---|
| INDEX_IFO(){ | |
|    INDEX_number | 8 |
|    Playback_Time | 40 |
|    Start Address | 64 |
|    End Address | 64 |
| } | |

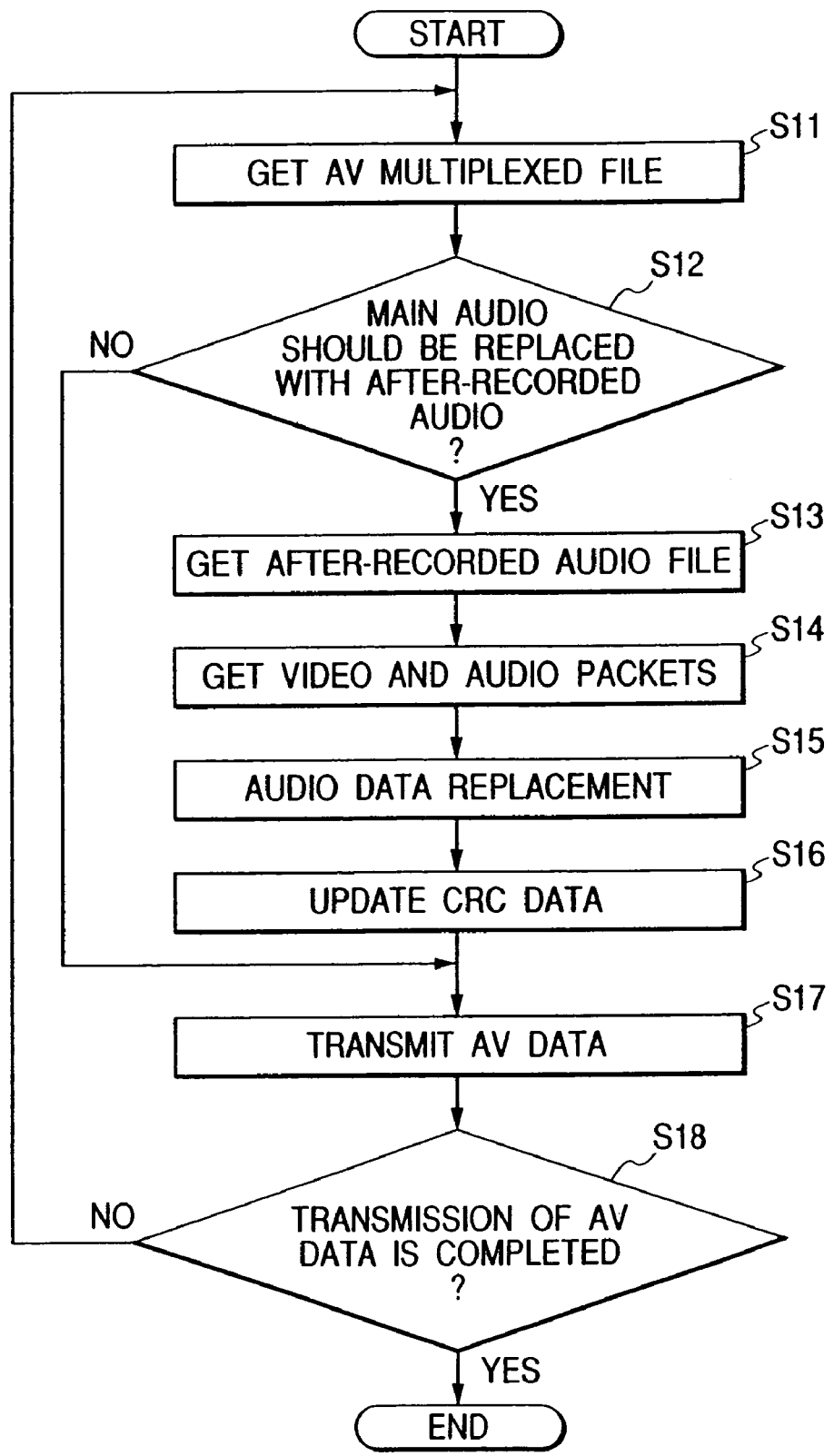

METHOD AND APPARATUS FOR GENERATING INFORMATION SIGNAL TO BE RECORDED

CROSS REFERENCE TO RELATED APPLICATIONS

This application is a divisional of U.S. application Ser. No. 11/700,841 filed Feb. 1, 2007, now U.S. Pat. No. 7,545,835, which in turn is a divisional of 10/280,011 filed Oct. 25, 2002, now U.S. Pat. No. 7,257,135, and claims priority from JP application No. 2001-394683 filed Dec. 26, 2001.

BACKGROUND OF THE INVENTION

1. Field of the Invention

This invention relates to a method of generating an information signal to be recorded, a method of reproducing an information signal, a method of transmitting an information signal, an apparatus for generating an information signal to be recorded, an apparatus for reproducing an information signal, an apparatus for transmitting an information signal, an information-signal recording medium, and a computer program for transmitting an information signal.

2. Description of the Related Art

In some cases, an analog audio signal and an analog video signal accompanied with the analog audio signal are converted into a digital audio signal and a digital video signal before being transmitted or recorded on a recording medium. The conversion of the analog video signal into the digital video signal is based on, for example, a compressively encoding procedure. A temporal error tends to occur between the digital audio signal and the digital video signal.

According to a known system designed to compensate for such a temporal error between audio and video, first timing information relating to desired audio playback moments is added to a digital audio signal while second timing information relating to desired video playback moments is added to a digital video signal. The desired audio playback moments and the desired video playback moments are chosen to provide synchronization between audio and video. During playback, information represented by the digital audio signal is converted into sound at a timing decided by the first timing information while information represented by the digital video signal is indicated at a timing decided by the second timing information. As a result, the playback of audio and the playback of video are synchronized with each other.

In a known multiplexing-based transmitting or recording system, a portion of a digital audio signal and a portion of a digital video signal which relate to a same desired playback moment are transmitted or recorded while being placed in a same group through a multiplexing procedure. This design makes possible the synchronous playback of audio and video.

Recently, multiplexed data containing compressively-encoded video data and audio data have sometimes been handled as a form of a bit stream which is referred to as a transport stream or a program stream, and which is designed to make possible the synchronous playback of audio and video. Generally, it is not easy to edit only audio data in such multiplexed data.

An example of the editing is post-recording or after-recording which edits only audio data in multiplexed data (a bit stream) and replaces the audio data with new data. The post-recording (the after-recording) is complicated.

Japanese patent application publication number 6-275018/1994 discloses a recording and reproducing apparatus which operates in either a recording mode or a reproducing mode. During the recording mode of operation of the apparatus in Japanese application 6-275018, information signals from N sources are converted into first digital signals through a compressively encoding procedure, and the first digital signals are modulated and converted into second digital signals. The second digital signals are written into a recording medium on a time sharing basis. During the reproducing mode of operation, the second digital signals are read out from the recording medium on a time sharing basis, and the read-out second digital signals are demodulated and converted back into the reproduced first digital signals. The reproduced first digital signals are converted back into the reproduced information signals. The reproduced information signals are simultaneously outputted.

Japanese patent application publication number 11-144378/1999 discloses a method of after-recording (post-recording) in which original data including a video bit stream are read out from a digital recording medium. The read-out original data are decoded. Audio data are encoded into a new audio bit stream in synchronism with the decoding of the original data. The new audio bit stream is written into an area of the digital recording medium which approximately corresponds in time position to the original-data recording area.

Japanese patent application publication number P2000-197005A discloses an information recording medium having an area "A" and an area "B". The area "A" stores a stream of packs including video packs and audio packs. The area "B" stores a table having first, second, and third information pieces. By referring to the first information piece in the table, a decision is made as to whether or not audio data in the audio packs in the area "A" correspond to silence. In the case where the audio data in the audio packs correspond to silence, post-recording (after-recording) can be implemented as follows. By referring to the second and third information pieces in the table, a new audio signal is encoded into new audio data, and the new audio data are formatted into new audio packs. The new audio packs are written over the old audio packs in the area "A".

Prior-art post-recording (prior-art after-recording) writes new audio data into an original multiplexed main stream so that the original multiplexed main stream changes to new one. Generally, it is difficult to convert the new multiplexed main stream back into the original one.

In the prior art, it is difficult to post-record a plurality of new audio signals, and to select one from the new audio signals during playback.

SUMMARY OF THE INVENTION

It is a first object of this invention to provide a method of generating an information signal to be recorded which makes possible the post-recording of a plurality of new audio signals, the selection of one from the new audio signals during playback, and the synchronous playback of audio and video.

It is a second object of this invention to provide an improved method of reproducing an information signal.

It is a third object of this invention to provide an improved method of transmitting an information signal.

It is a fourth object of this invention to provide an improved apparatus for generating an information signal to be recorded.

It is a fifth object of this invention to provide an improved apparatus for reproducing an information signal.

It is a sixth object of this invention to provide an improved apparatus for transmitting an information signal.

It is a seventh object of this invention to provide an improved information-signal recording medium.

It is an eighth object of this invention to provide an improved computer program for transmitting an information signal.

A first aspect of this invention provides a method of generating an information signal to be recorded. The method comprises the steps of multiplexing 1) a compressively-encoding-resultant video signal which results from compressively encoding a video signal, 2) a first compressively-encoding-resultant audio signal which results from compressively encoding a first audio signal having a synchronized relation with the video signal, 3) a reference clock information signal relating to synchronization between the compressively-encoding-resultant video signal and the first compressively-encoding-resultant audio signal, and 4) an indication timing information signal based on the reference clock information signal and designating an indication timing of the video signal to get an AV multiplexing-resultant signal; generating a second audio signal as a substitution playback audio signal which can be reproduced instead of the first audio signal while being synchronous with the video signal during playback; compressively encoding the second audio signal to get a second compressively-encoding-resultant audio signal; and adding a sound-production-timing information signal to the second compressively-encoding-resultant audio signal to get the substitution playback audio signal, the sound-production-timing information signal being based on the reference clock information signal and relating to synchronization with the video signal.

A second aspect of this invention is based on the first aspect thereof, and provides a method further comprising the steps of dividing the substitution playback audio signal into packets each having a prescribed data size, and multiplexing the reference clock information signal and the sound-production-timing information signal with each of the packets.

A third aspect of this invention is based on the first aspect thereof, and provides a method wherein the substitution playback audio signal comprises a plurality of subordinate substitution playback audio signals which result from compressively encoding audio signals respectively, and different identification signals are added to the subordinate substitution playback audio signals respectively.

A fourth aspect of this invention provides a method of reproducing an information signal. The method comprises the steps of reproducing an AV multiplexing-resultant signal generated by multiplexing 1) a compressively-encoding-resultant video signal resulting from compressively encoding a video signal, 2) a first compressively-encoding-resultant audio signal resulting from compressively encoding a first audio signal having a synchronized relation with the video signal, 3) a reference clock information signal relating to synchronization between the compressively-encoding-resultant video signal and the first compressively-encoding-resultant audio signal, and 4) an indication timing information signal based on the reference clock information signal and designating an indication timing of the video signal; reproducing the video signal from the reproduced AV multiplexing-resultant signal; reproducing a substitution playback audio signal to reproduce a second audio signal, the substitution playback audio signal being generated by 1) compressively encoding the second audio signal to get a second compressively-encoding-resultant audio signal, and 2) adding a sound-production-timing information signal to the second compressively-encoding-resultant audio signal, the sound-production-timing information signal designating a sound production timing of the second compressively-encoding-resultant audio signal; deriving the reference clock information signal and the indication timing information signal from the reproduced AV multiplexing-resultant signal; deriving the compressively-encoding-resultant video signal from the reproduced AV multiplexing-resultant signal; decoding the derived compressively-encoding-resultant video signal to get a decoding-resultant video signal; supplying the decoding-resultant video signal as an output video signal in response to the derived reference clock information signal and the derived indication timing information signal; deriving the sound-production-timing information signal and the second audio signal from the reproduced substitution playback audio signal; supplying the derived second audio signal as an output audio signal in response to the derived reference clock information signal and the derived sound-production-timing information signal; comparing the reference clock information signal and the indication timing information signal to get a first comparison result; supplying the video signal as an indication-purpose signal in accordance with the first comparison result; comparing the reference clock information signal and the sound-production-timing information signal to get a second comparison result; and supplying the second audio signal signal as a sound-production-purpose signal in accordance with the second comparison result.

A fifth aspect of this invention is based on the fourth aspect thereof, and provides a method wherein the substitution playback audio signal comprises a plurality of subordinate substitution playback audio signals which result from compressively encoding source audio signals respectively, and different identification signals are added to the subordinate substitution playback audio signals respectively, and wherein one of the source audio signals is selected by referring to the identification signals, and the selected source audio signal and the video signal are supplied as output reproduced signals synchronous with each other.

A sixth aspect of this invention provides a method of transmitting an information signal. The method comprises the steps of generating a main AV multiplexing-resultant signal by multiplexing 1) a compressively-encoding-resultant video signal which results from compressively encoding a video signal, 2) a first compressively-encoding-resultant audio signal which results from compressively encoding a first audio signal having a synchronized relation with the video signal, 3) a reference clock information signal relating to synchronization between the compressively-encoding-resultant video signal and the first compressively-encoding-resultant audio signal, and 4) an indication timing information signal designating an indication timing of the video signal on the basis of the reference clock information signal; generating a substitution playback audio signal by 1) compressively encoding a second audio signal to get a second compressively-encoding-resultant audio signal, and 2) adding a sound-production-timing information signal to the second compressively-encoding-resultant audio signal, the sound-production-timing information signal designating a sound production timing of the second compressively-encoding-resultant audio signal on the basis of the reference clock information signal, wherein the second audio signal can be reproduced instead of the first audio signal; generating a substitution AV multiplexing-resultant signal as a signal for reproducing the compressively-encoding-resultant video signal together with the second compressively-encoding-resultant audio signal; feeding the substitution AV multiplexing-resultant signal to a transmission line; deriving the second compressively-encoding-resultant audio signal from the substitution playback audio signal; and replacing the first compressively-encoding-resultant audio signal in the main AV multiplexing-resultant signal with the derived second compressively-encoding-resultant audio signal to change the main AV multiplexing-resultant signal into the substitution AV multiplexing-resultant signal before feeding the substitution AV multiplexing-resultant signal to the transmission line.

A seventh aspect of this invention provides an apparatus for generating an information signal to be recorded. The apparatus comprises means for multiplexing 1) a compressively-encoding-resultant video signal resulting from compressively encoding a video signal, 2) a first compressively-encoding-resultant audio signal resulting from compressively encoding a first audio signal having a synchronized relation with the video signal, 3) a reference clock information signal relating to synchronization between the compressively-encoding-resultant video signal and the first compressively-encoding-resultant audio signal, and 4) an indication timing information signal based on the reference clock information signal and designating an indication timing of the video signal to get an AV multiplexing-resultant signal; means for generating a second audio signal as a substitution playback audio signal which can be reproduced instead of the first audio signal while being synchronous with the video signal during playback; means for compressively encoding the second audio signal to get a second compressively-encoding-resultant audio signal; and means for adding a sound-production-timing information signal to the second compressively-encoding-resultant audio signal to get the substitution playback audio signal, the sound-production-timing information signal being based on the reference clock information signal and relating to synchronization with the video signal.

An eighth aspect of this invention provides an apparatus for reproducing an information signal. The apparatus comprises means for reproducing an AV multiplexing-resultant signal generated by multiplexing 1) a compressively-encoding-resultant video signal which results from compressively encoding a video signal, 2) a first compressively-encoding-resultant audio signal which results from compressively encoding a first audio signal having a synchronized relation with the video signal, 3) a reference clock information signal relating to synchronization between the compressively-encoding-resultant video signal and the first compressively-encoding-resultant audio signal, and 4) an indication timing information signal designating an indication timing of the video signal; means for reproducing the video signal from the reproduced AV multiplexing-resultant signal; means for reproducing a substitution playback audio signal to reproduce a second audio signal, the substitution playback audio signal being generated by 1) compressively encoding the second audio signal to get a second compressively-encoding-resultant audio signal, and 2) adding a sound-production-timing information signal to the second compressively-encoding-resultant audio signal, the sound-production-timing information signal designating a sound production timing of the second compressively-encoding-resultant audio signal, wherein the second audio signal can be reproduced instead of the first audio signal; means for deriving the reference clock information signal and the indication timing information signal from the reproduced AV multiplexing-resultant signal; means for deriving the compressively-encoding-resultant video signal from the reproduced AV multiplexing-resultant signal; means for decoding the derived compressively-encoding-resultant video signal to get a decoding-resultant video signal; means for supplying the decoding-resultant video signal as an output video signal in response to the derived reference clock information signal and the derived indication timing information signal; means for deriving the sound-production-timing information signal and the second audio signal from the reproduced substitution playback audio signal; and means for supplying the derived second audio signal as an output audio signal in response to the derived reference clock information signal and the derived sound-production-timing information signal.

A ninth aspect of this invention is based on the eighth aspect thereof, and provides an apparatus wherein the substitution playback audio signal comprises a plurality of subordinate substitution playback audio signals which result from compressively encoding source audio signals respectively, and different identification signals are added to the subordinate substitution playback audio signals respectively, and wherein one of the source audio signals is selected by referring to the identification signals, and the selected source audio signal and the video signal are supplied as output reproduced signals synchronous with each other.

A tenth aspect of this invention provides an apparatus for transmitting an information signal. The apparatus comprises means for generating a main AV multiplexing-resultant signal by multiplexing 1) a compressively-encoding-resultant video signal which results from compressively encoding a video signal, 2) a first compressively-encoding-resultant audio signal which results from compressively encoding a first audio signal having a synchronized relation with the video signal, 3) a reference clock information signal relating to synchronization between the compressively-encoding-resultant video signal and the first compressively-encoding-resultant audio signal, and 4) an indication timing information signal designating an indication timing of the video signal on the basis of the reference clock information signal; means for generating a substitution playback audio signal by 1) compressively encoding a second audio signal to get a second compressively-encoding-resultant audio signal, and 2) adding a sound-production-timing information signal to the second compressively-encoding-resultant audio signal, the sound-production-timing information signal designating a sound production timing of the second compressively-encoding-resultant audio signal on the basis of the reference clock information signal, wherein the second audio signal can be reproduced instead of the first audio signal; means for generating a substitution AV multiplexing-resultant signal as a signal for reproducing the compressively-encoding-resultant video signal together with the second compressively-encoding-resultant audio signal; means for feeding the substitution AV multiplexing-resultant signal to a transmission line; means for deriving the second compressively-encoding-resultant audio signal from the substitution playback audio signal; and means for replacing the first compressively-encoding-resultant audio signal in the main AV multiplexing-resultant signal with the derived second compressively-encoding-resultant audio signal to change the main AV multiplexing-resultant signal into the substitution AV multiplexing-resultant signal before feeding the substitution AV multiplexing-resultant signal to the transmission line.

An eleventh aspect of this invention provides an information-signal recording medium having a common surface storing both an AV multiplexing-resultant signal and a substitution playback audio signal; the AV multiplexing-resultant signal being generated by multiplexing 1) a compressively-encoding-resultant video signal which results from compressively encoding a video signal, 2) a first compressively-encoding-resultant audio signal which results from compressively encoding a first audio signal having a synchronized relation with the video signal, 3) a first reference clock information signal relating to synchronization between the compressively-encoding-resultant video signal and the first compressively-encoding-resultant audio signal, and 4) an indication timing information signal designating an indication timing of the video signal; the substitution playback audio signal being generated by 1) compressively encoding a second audio signal to get a second compressively-encoding-resultant audio signal, and 2) adding a second reference clock information signal to the second compressively-encoding-resultant audio signal, wherein the second audio signal can be reproduced instead of the first audio signal; wherein the second reference clock information signal added to the second compressively-encoding-resultant audio signal is equal to the first reference clock information signal in the AV multiplexing-resultant signal, and the second compressively-encoding-resultant audio signal contains a multiplexed component being a sound-production-timing information signal based on one of the first and second reference clock information signals and relating to synchronization with the video signal; and wherein the video signal is reproduced in response to the first reference clock information signal in the AV multiplexing-resultant signal, and reproduction of the second audio signal can be synchronized with the reproduction of the video signal in response to the reference clock information signal same as that used for the reproduction of the video signal.

A twelfth aspect of this invention provides a computer program for transmitting an information signal. The computer program comprises the steps of generating a main AV multiplexing-resultant signal by multiplexing 1) a compressively-encoding-resultant video signal which results from compressively encoding a video signal, 2) a first compressively-encoding-resultant audio signal which results from compressively encoding a first audio signal having a synchronized relation with the video signal, 3) a reference clock information signal relating to synchronization between the compressively-encoding-resultant video signal and the first compressively-encoding-resultant audio signal, and 4) an indication timing information signal designating an indication timing of the video signal on the basis of the reference clock information signal; generating a substitution playback audio signal by 1) compressively encoding a second audio signal to get a second compressively-encoding-resultant audio signal, and 2) adding a sound-production-timing information signal to the second compressively-encoding-resultant audio signal, the sound-production-timing information signal designating a sound production timing of the second compressively-encoding-resultant audio signal on the basis of the reference clock information signal, wherein the second audio signal can be reproduced instead of the first audio signal; generating a substitution AV multiplexing-resultant signal as a signal for reproducing the compressively-encoding-resultant video signal together with the second compressively-encoding-resultant audio signal; feeding the substitution AV multiplexing-resultant signal to a transmission line; deriving the second compressively-encoding-resultant audio signal from the substitution playback audio signal; and replacing the first compressively-encoding-resultant audio signal in the main AV multiplexing-resultant signal with the derived second compressively-encoding-resultant audio signal to change the main AV multiplexing-resultant signal into the substitution AV multiplexing-resultant signal before feeding the substitution AV multiplexing-resultant signal to the transmission line.

BRIEF DESCRIPTION OF THE DRAWINGS

FIG. 15 is a diagram of the syntax structure of play list information "PLAYL_IFO" in FIG. 11.

FIG. 16 is a diagram of the syntax structure of index information "INDEX_IFO" in FIG. 13.

FIG. 19 is a flowchart of a segment of a control program for a CPU in FIG. 18.

DETAILED DESCRIPTION OF THE INVENTION

First Embodiment

Figure 1:
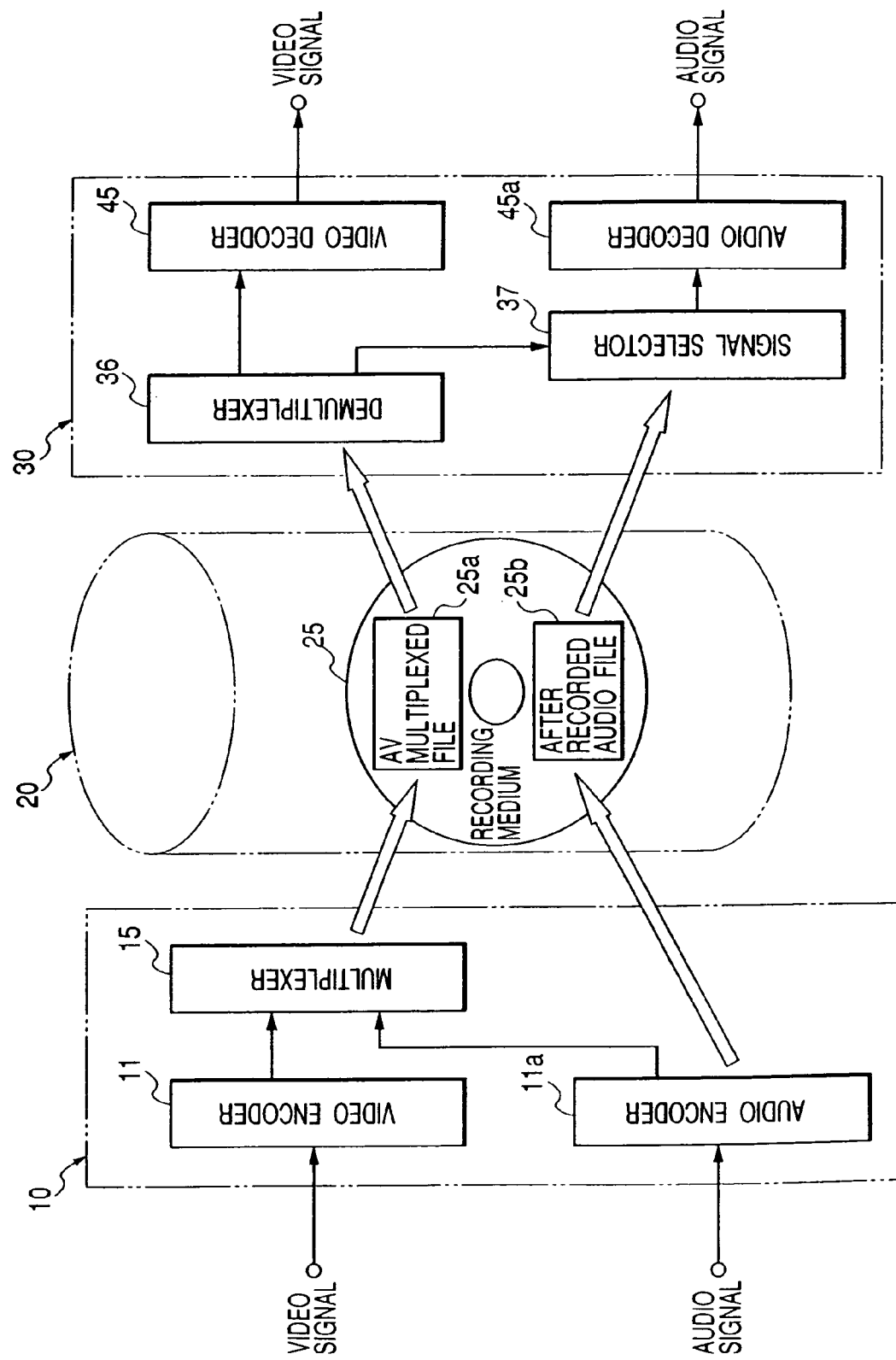
FIG. 1 is a block diagram of an information-signal recording and reproducing system according to a first embodiment of this invention.

FIG. 1 shows an information-signal recording and reproducing system according to a first embodiment of this invention. The system of FIG. 1 includes an information-signal generating apparatus 10, an recording-medium drive 20, an information-signal recording medium 25, and an information-signal reproducing apparatus 30. The information-signal generating apparatus 10 has a vide encoder 11, an audio encoder 11a, and a multiplexer 15. The recording-medium drive 20 is connected with the information-signal generating apparatus 10 and the information-signal reproducing apparatus 30. The recording-medium drive 20 can write and read an information signal on and from the recording medium 25. A hard-disk writer/reader or an optical-disk writer/reader may be used as the recording-medium drive 20. A file containing an information signal can be recorded on the recording medium 25. Specifically, an AV (audio-visual) multiplexing-resultant file 25a and an after-recorded audio file 25b can be stored in the recording medium 25. Preferably, the recording medium 25 has a recording surface on which both the AV multiplexing-resultant file 25a and the after-recorded audio file 25b are recorded. The information-signal reproducing apparatus 30 has a demultiplexer 36, a signal selector 37, a video decoder 45, and an audio decoder 45a. Preferably, the information-signal reproducing apparatus 30 is connected to a monitor TV apparatus.

The system of FIG. 1 operates in a mode which can be selected from different ones including a recording mode, a first playback mode, and a second playback mode. During the recording mode of operation, the video encoder 11 receives a video signal accompanied with a first audio signal. The video encoder 11 compressively encodes the received video signal into a compressively-encoding-resultant video signal according to the MPEG (Moving Picture Experts Group) standards for video encoding. Thus, the video encoder 11 includes an MPEG encoder (an MPEG video encoder). The video encoder 11 feeds the compressively-encoding-resultant video signal to a first input terminal of the multiplexer 15.

The audio encoder 11a receives the first audio signal which accompanies the video signal. The audio encoder 11a compressively encodes the first audio signal into a first compressively-encoding-resultant audio signal according to the MPEG standards for audio encoding. The audio encoder 11a feeds the first compressively-encoding-resultant audio signal to a second input terminal of the multiplexer 15.

The device 15 multiplexes the compressively-encoding-resultant video signal and the first compressively-encoding-resultant audio signal into an AV multiplexing-resultant signal according to the MPEG system standards. The multiplexer 15 outputs the AV multiplexing-resultant signal to the recording-medium drive 20. The recording-medium drive 20 records the AV multiplexing-resultant signal on the recording medium 25 as an AV multiplexing-resultant file 25a.

After the recording of the AV multiplexing-resultant file 25a is completed, a second audio signal starts to be recorded on the recording medium 25 as an after-recorded audio file 25b separate from the AV multiplexing-resultant file 25a. Specifically, the audio encoder 11a receives a second audio signal (an after-recording-purpose audio signal or a post-recording-purpose audio signal). The audio encoder 11a compressively encodes the second audio signal into a second compressively-encoding-resultant audio signal according to the MPEG standards for audio encoding. The audio encoder 11a feeds the second compressively-encoding-resultant audio signal to the multiplexer 15. The multiplexer 15 passes the second compressively-encoding-resultant audio signal to the recording-medium drive 20. The recording-medium drive 20 records the second compressively-encoding-resultant audio signal on the recording medium 25 as an after-recorded audio file 25b.

The second audio signal differs in contents from the first audio signal. The second audio signal is generated in synchronism with the previously-mentioned video signal. For example, the second audio signal is generated while the video signal is reproduced. The first audio signal is generated by picking up sound in a scene-shooting spot simultaneously with shooting a scene to produce the video signal. On the other hand, the second audio signal is generated as a representation of narration or background music played after shooting the scene. The second audio signal is also referred to as the after-recording-purpose audio signal or the post-recording-purpose audio signal.

An AV signal having perfect audio and video information is referred to as a complete package signal. In the case where an AV program modified from that represented by a complete package signal is produced, by a user or a third person, from the video signal same as that in the complete package signal and an audio signal different from that in the complete package, the audio signal is defined as an after-recording-purpose audio signal or a post-recording-purpose audio signal.

The system of FIG. 1 is designed so that a second audio signal (an after-recorded audio signal) and a video signal in a complete package signal can be synchronously reproduced, and the complete package signal can also be reproduced. Furthermore, the system of FIG. 1 is designed to reduce the amount of information recorded on the recording medium 25.

As previously mentioned, the AV multiplexing-resultant signal is recorded on the recording medium 25 as an AV multiplexing-resultant file 25a. In general, the AV multiplexing-resultant signal relates to a complete package signal. Audio information and video information in the AV multiplexing-resultant file 25a can be synchronously played back. The second audio signal is recorded on the recording medium 25 as an after-recorded audio file 25b separate from the AV multiplexing-resultant file 25a. As will be explained later, sync signals are added to the AV multiplexing-resultant file 25a and the after-recorded audio file 25b to make possible the synchronous playback of audio information in the after-recorded audio file 25b and video information in the AV multiplexing-resultant file 25a.

The modes of operation of the system in FIG. 1 include the first playback mode and the second playback mode. The first playback mode of operation is designed to reproduce a complete package signal. During the first playback mode of operation, the recording-medium drive 20 accesses an AV multiplexing-resultant file 25a on an information-signal recording medium 25 and reads out an AV multiplexing-resultant signal therefrom. The recording-medium drive 20 feeds the read-out AV multiplexing-resultant signal to the demultiplexer 36.

The demultiplexer 36 separates the AV multiplexing-resultant signal into a compressively-encoding-resultant video signal and a first compressively-encoding-resultant audio signal according to the MPEG system standards. The demultiplexer 36 feeds the compressively-encoding-resultant video signal to the video decoder 45. The demultiplexer 36 feeds the first compressively-encoding-resultant audio signal to the signal selector 37.

The video decoder 45 expansively decodes the compressively-encoding-resultant video signal into an original video signal (a reproduced video signal) according to the MPEG standards for video decoding. Thus, the video decoder 45 includes an MPEG decoder (an MPEG video decoder). The video decoder 45 feeds the reproduced video signal to a monitor TV apparatus. A display of the monitor TV apparatus indicates the reproduced video signal.

The signal selector 37 passes the first compressively-encoding-resultant audio signal to the audio decoder 45a. The audio decoder 45a expansively decodes the first compressively-encoding-resultant audio signal into a first original audio signal (a first reproduced audio signal) according to the MPEG standards for audio decoding. The audio decoder 45a feeds the first reproduced audio signal to the monitor TV apparatus. Loudspeakers of the monitor TV apparatus convert the first reproduced audio signal into corresponding sound. The playback of the first reproduced audio signal is synchronous with the playback of the reproduced video signal.

The second playback mode of operation is designed to synchronously reproduce a second audio signal (an after-recorded audio signal) and a video signal in a complete package signal. During the second playback mode of operation, the recording-medium drive 20 alternately accesses an AV multiplexing-resultant file 25a and an after-recorded audio file 25b on an information-signal recording medium 25 on a time sharing basis. The recording-medium drive 20 reads out an AV multiplexing-resultant signal from the AV multiplexing-resultant file 25a. The recording-medium drive 20 feeds the read-out AV multiplexing-resultant signal to the demultiplexer 36. The recording-medium drive 20 reads out a second compressively-encoding-resultant audio signal from the after-recorded audio file 25b. The recording-medium drive 20 feeds the second compressively-encoding-resultant audio signal to the signal selector 37.

The demultiplexer 36 separates the AV multiplexing-resultant signal into a compressively-encoding-resultant video signal and a first compressively-encoding-resultant audio signal according to the MPEG system standards. The demultiplexer 36 feeds the compressively-encoding-resultant video signal to the video decoder 45. The demultiplexer 36 feeds the first compressively-encoding-resultant audio signal to the signal selector 37.

The video decoder 45 expansively decodes the compressively-encoding-resultant video signal into an original video signal (a reproduced video signal) according to the MPEG standards for video decoding. The video decoder 45 feeds the reproduced video signal to a monitor TV apparatus. A display of the monitor TV apparatus indicates the reproduced video signal.

The signal selector 37 selects the second compressively-encoding-resultant audio signal, and passes the selected signal to the audio decoder 45a. Thus, the signal selector 37 rejects the first compressively-encoding-resultant audio signal coming from the demultiplexer 36. The audio decoder 45a expansively decodes the second compressively-encoding-resultant audio signal into a second original audio signal (a second reproduced audio signal) according to the MPEG standards for audio decoding. The second reproduced audio signal is a reproduced after-recording-purpose audio signal. The audio decoder 45a feeds the second reproduced audio signal to the monitor TV apparatus. Loudspeakers of the monitor TV apparatus convert the second reproduced audio signal (the reproduced after-recording-purpose audio signal) into corresponding sound. The playback of the second reproduced audio signal is synchronous with the playback of the reproduced video signal. As will be described later, the synchronization between the playback of the second reproduced audio signal and the playback of the reproduced video signal is provided by sync signals added to the video information in the AV multiplexing-resultant file 25a and the audio information in the after-recorded audio file 25b.

The system of FIG. 1 includes an user interface. The user can designate the mode of operation of the system in FIG. 1 by actuating the user interface. The signal selector 37 responds to a signal from the user interface which represents the designated mode of operation is the first playback mode or the second playback mode. When the designated mode of operation is the first playback mode, the signal selector 37 passes the first compressively-encoding-resultant audio signal from the demultiplexer 36 to the audio decoder 45a. On the other hand, when the designated mode of operation is, the second playback mode, the signal selector 37 selects the second compressively-encoding-resultant audio signal and passes the selected signal to the audio decoder 45a.

Figure 2:
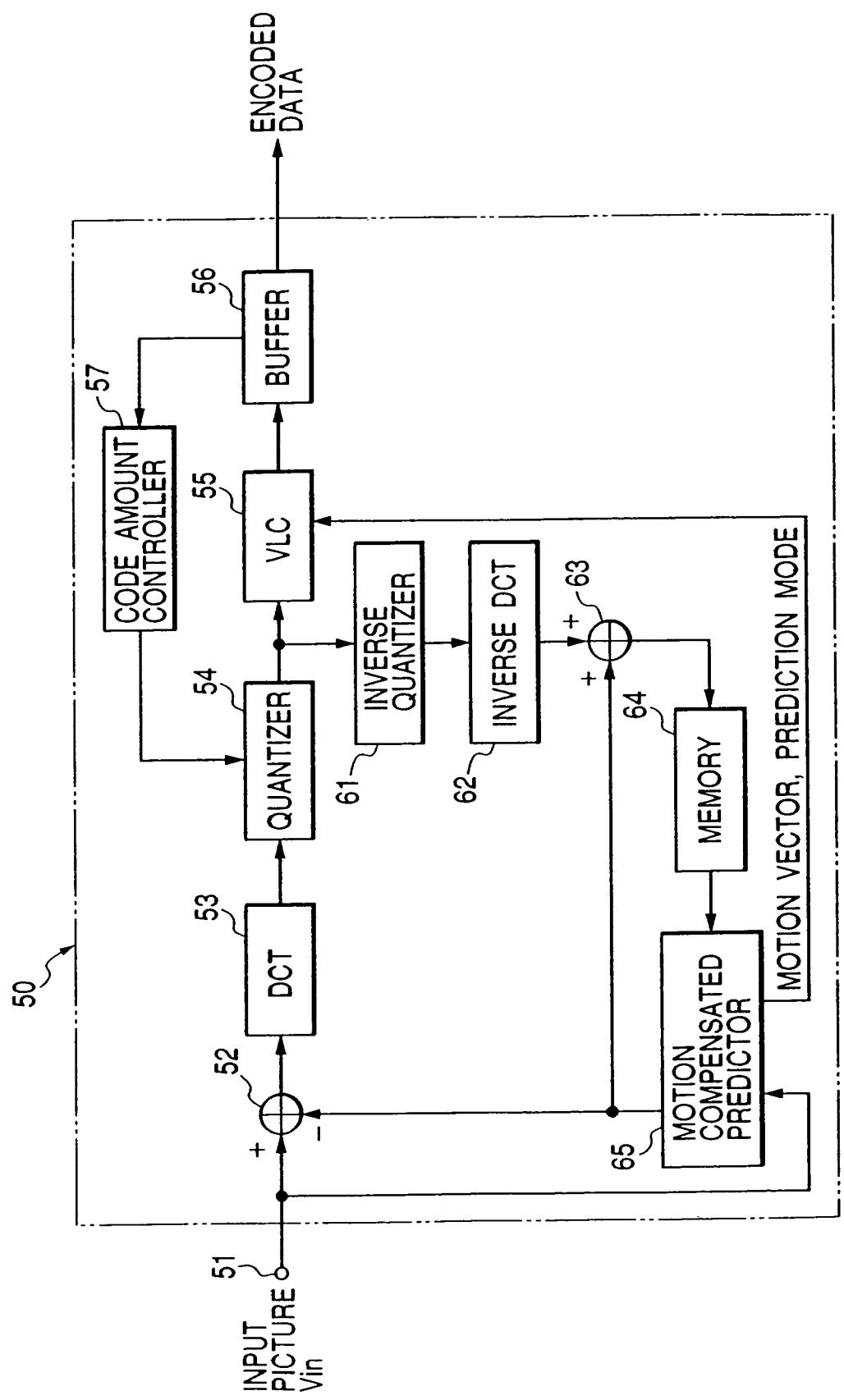
FIG. 2 is a block diagram of an MPEG encoder.

FIG. 2 shows an MPEG encoder 50 which can be used as that in the video encoder 11 (see FIG. 1). The MPEG encoder 50 includes an adder 52 operated as a subtracter. The subtracter 52 receives an input video signal Vin via an input terminal 51. The subtracter 52 calculates an inter-frame prediction error, that is, a residual (an error) between a picture represented by the input video signal Vin and a final reference picture (a final predicted picture) represented by output data from a motion-compensated predictor 65. The subtracter 52 outputs data indicating the calculated residual (the calculated inter-frame prediction error).

Prediction implemented by the motion-compensated predictor 65 is designed as follows. Prediction directions are of three modes, that is, a direction from the past ("forward"), a direction from the future ("backward"), and a direction from both the past and future ("interpolative"). Accordingly, there are prediction from the past ("forward"), prediction from the future ("backward"), and prediction from both the past and future ("interpolative"). An actually-used prediction direction can be changed MB by MB, where MB denotes a macroblock having 16 by 16 pixels. Every picture is divided into a prescribed number of MBs. The actually-used prediction direction is basically decided by the type of every picture represented by the input video signal Vin. Pictures are classified into P pictures (predictive coded pictures), B pictures (bidirectionally predictive coded pictures), and I pictures (intra-coded pictures). MBs representative of a P picture are of first and second modes. P-picture MBs of the first mode are encoded according to prediction from the past. P-picture MBs of the second mode are independently encoded without prediction. MBs representative of a B picture are of first, second, third, and fourth modes. B-picture MBs of the first mode are encoded according to prediction from the future. B-picture MBs of the second mode are encoded according to prediction from the past. B-picture MBs of the third mode are encoded according to prediction from both the past and future. B-picture MBs of the fourth mode are independently encoded without prediction. MBs representative of an I picture are independently encoded without prediction.

Motion compensation implemented by the motion-compensated predictor 65 is designed as follows. According to motion compensation, pattern matching between two pictures is performed for each MB to detect a motion vector or motion vectors at an accuracy corresponding to a half pel (a half pixel). One of the two pictures is given by the input video signal Vin, and the other is referred to as a basic reference picture or a source picture for motion-compensated prediction. The basic reference picture is shifted in accordance with detected motion vectors. A final reference picture (a final predicted picture) is generated on the basis of the shift of the basic reference picture. In the absence of motion compensation, the basic reference picture is directly used as a final reference picture. Generally, a motion vector has a horizontal-direction component and a vertical-direction component. Information representing a detected motion vector or detected motion vectors, and MC-mode (motion-compensation mode) information representing a prediction direction or indicating a source picture from which prediction is implemented are transmitted as added information relating to each MB. A GOP (group of pictures) is defined as a sequence of pictures starting from an I picture and ending at a picture immediately preceding a next I picture. Generally, one GOP has about 15 successive pictures.

The residual-indicating data outputted from the subtracter 52 are subjected to discrete cosine transform (DCT) by a DCT device 53. Specifically, the DCT device 53 divides every MB represented by the residual-indicating data into 4 DCT blocks each having 8 by 8 pixels. The DCT device 53 subjects each DCT block to two-dimensional DCT to generate data representing DCT coefficients. The DCT device 53 outputs the generated DCT-coefficient data. In general, since a video signal is rich in low-frequency components, there occur a lot of effective DCT coefficients corresponding to low frequencies.

DCT coefficients represented by the output data from the DCT device 53 are quantized by a quantizer 54 in response to a quantization value. The quantization value is equal to a quantization matrix multiplied by a scalar quantization scale. The quantization matrix has 8 by 8 elements resulting from a process of weighting two-dimensional frequency components according to visual sensation. The quantization includes a step of dividing DCT coefficients by the quantization value.

Quantization-resultant data outputted from the quantizer 54 are encoded by a VLC device 55 into data of a variable length code (VLC). Specifically, a direct-current (DC) component of the quantization-resultant data is encoded by DPCM (differential pulse code modulation). Alternating-current (AC) components of the quantization-resultant data are scanned in zigzag along a direction from a high frequency toward a low frequency, and are subjected to Huffman encoding in which data pieces having higher occurrence possibilities are assigned to shorter code words. The VLC device 55 receives the motion-vector information and the MC-mode information from the motion-compensated predictor 65. The VLC device 65 adds the motion-vector information and the MC-mode information to the VLC data. The resultant VLC data are temporarily stored in a buffer 56. The VLC data are outputted from the buffer 56 at a prescribed transfer rate as encoding-resultant MPEG data in the form of a bit stream.

The buffer 56 informs a code amount controller 57 of the actual amount of encoding-resultant data for every MB, that is, the total number of bits composing encoding-resultant data for every MB. The code amount controller 57 calculates an error between the actual amount of encoding-resultant data and a target amount thereof. The code amount controller 57 adjusts the quantization scale used by the quantizer 54 in response to the calculated data amount error, and thereby controls the actual amount of encoding-resultant data.

The quantization-resultant data outputted from the quantizer 54 are subjected to inverse quantization by an inverse quantizer 61, being converted back to DCT-coefficient data. The inverse quantizer 61 outputs the DCT-coefficient data. The DCT-coefficient data outputted from the inverse quantizer 61 are subjected to inverse DCT by an inverse DCT device 62, being converted back into residual-indicating data. The inverse DCT device 62 outputs the residual-indicating data. A residual picture represented by the output data from the inverse DCT device 62 and a final reference picture (a final predicted picture) represented by the output data from the motion-compensated predictor 65 are added by an adder 63. The adder 63 outputs addition-resultant video data. The addition-resultant video data are temporarily stored in a memory 64. Video data are fed from the memory 64 to the motion-compensated predictor 65. The output video data from the memory 64 are used by the motion-compensated predictor 65 as an indication of a basic reference picture or a source picture for motion-compensated prediction.

Figure 3:
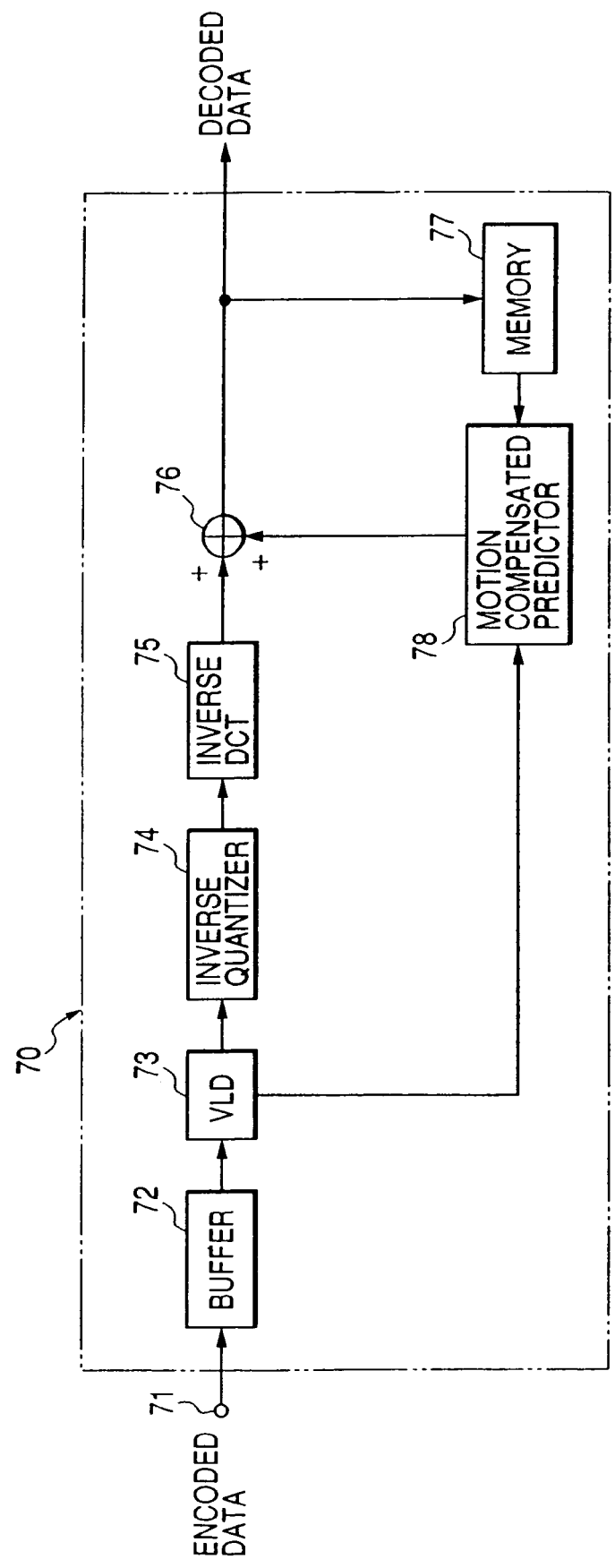
FIG. 3 is a block diagram of an MPEG decoder.

FIG. 3 shows an MPEG decoder 70 which can be used as that in the video decoder 45 (see FIG. 1). The MPEG decoder 70 includes a buffer 72. The buffer 72 receives, via an input terminal 71, encoding-resultant MPEG data in the form of a bit stream. The encoding-resultant MPEG data are temporarily stored in the buffer 72 before being outputted to a VLD (variable length decoding) device 73 therefrom. The VLD device 73 subjects the output data from the buffer 72 to VLD inverse with respect to VLC, thereby recovering DC-component data and AC-component data. The AC-component data are scanned in zigzag along a direction from a high frequency toward a low frequency. The DC-component data and the resultant AC-component data are arranged in a matrix having 8 by 8 elements. The VLD device 73 outputs the matrix-arranged data to an inverse quantizer 74. The VLD device 73 extracts motion-vector information and MC-mode information from the data outputted by the buffer 72. The VLD device 73 outputs the motion-vector information and the MC-mode information to a motion-compensated predictor 78.

The inverse quantizer 74 subjects the output data from the VLD device 73 to inverse quantization responsive to the quantization value, thereby recovering DCT-coefficient data. The inverse quantization includes a step of multiplying processed data values by the quantization value. It should be noted that the quantization value is equal to the quantization matrix multiplied by the scalar quantization scale. The DCT-coefficient data are outputted from the inverse quantizer 74 to an inverse DCT device 75, being subjected to inverse DCT and hence being converted back into residual-indicating data. The inverse DCT device 75 outputs the residual-indicating data. A residual picture represented by the output data from the inverse DCT device 75 and a final reference picture (a final predicted picture) represented by output data from the motion-compensated predictor 78 are added by an adder 76. The adder 76 outputs addition-resultant video data as decoding-resultant video data (original video data). The decoding-resultant video data are transmitted toward an external. The addition-resultant video data outputted from the adder 76 are temporarily stored in a memory 77. Video data are fed from the memory 77 to the motion-compensated predictor 78. The output video data from the memory 77 are used by the motion-compensated predictor 78 as an indication of a basic reference picture or a source picture for motion-compensated prediction. The motion-compensated predictor 78 generates a final reference picture (a final predicted picture) in response to the basic reference picture, the motion-vector information, and the MC-mode information. The motion-compensated predictor 78 outputs data representing the final reference picture.

The MPEG system standards prescribe the following five items.

1) Synchronous reproduction of a plurality of encoding-resultant bit streams;
2) Multiplexing a plurality of encoding-resultant bit streams into a single bit stream;
3) Initialization of encoding-resultant data in a buffer (the buffer 72 in FIG. 3) at start of reproduction;
4) Management of data in a buffer or buffers to get a continuous decoding-resultant video signal and a continuous decoding-resultant audio signal; and
5) Management relating to the setting of timings such as a decoding start timing and a playback indication timing.

Thus, according to the MPEG system standards, the managements relating to encoding-resultant data are implemented. The encoding-resultant data are formatted or processed into data of a packet structure, and are multiplexed. Management data for implementing the operation steps in the above items are added to the multiplexing-resultant data.

The multiplexing of information which conforms to the MPEG system standards includes a step of packeting the information. For example, in the case where video information and audio information are required to be multiplexed, each of the video information and the audio information is divided into packets having a suitable length. Additional information such as header information is added to each packet. Video-information packets and audio-information packets are mixed into a packet sequence before the packet sequence is transmitted. Therefore, the video-information packets and the audio-information packets are transmitted on a time sharing basis. The header information contains information for identifying whether a related packet is of video, audio, or other, and also timing information for synchronization. In general, the packet length depends on a transmission medium and an application. For example, the packet length is equal to 53 bytes in the case of ATM (asynchronous transfer mode). The packet length is equal to 4 kilobytes in the case of an optical disc. According to the MPEG system standards, the packet length is variable, and can be set to an arbitrary value.

Data to be transmitted are divided into packs, and are packeted. One pack is composed of several packets. A header portion of each pack is loaded with a pack-start-code and an SCR (system clock reference). A header of each packet is loaded with a stream ID and a time stamp. The time stamp contains timing information for synchronization between audio and video. The time stamp is of two types referred to as a DTS (decoding time stamp) and a PTS (presentation time stamp) respectively. The transmitted data contain a periodically-occurring PCR (program clock reference) indicating a frequency of 27 MHz. A reference clock common to decoders can be locked to the frequency indicated by the PCR. The DTS denotes the desired decoding start time for a first access unit in a related packet, while the PTS denotes the desired indication start time (the desired playback start time) therefor. One access unit corresponds to one picture in the case of video. One access unit corresponds to 1152 samples in the case of audio. The DTS and the PTS are given at a time accuracy based on the frequency indicated by the PCR.

The PCR is used as a reference clock information signal. In the case of a video packet, the PTS is used as an indication timing information signal designating a timing of indication of related video information. In the case of an audio packet, the PTS is used as a sound-production-timing information signal designating a timing of conversion of related audio information into corresponding sound.

Figure 4:
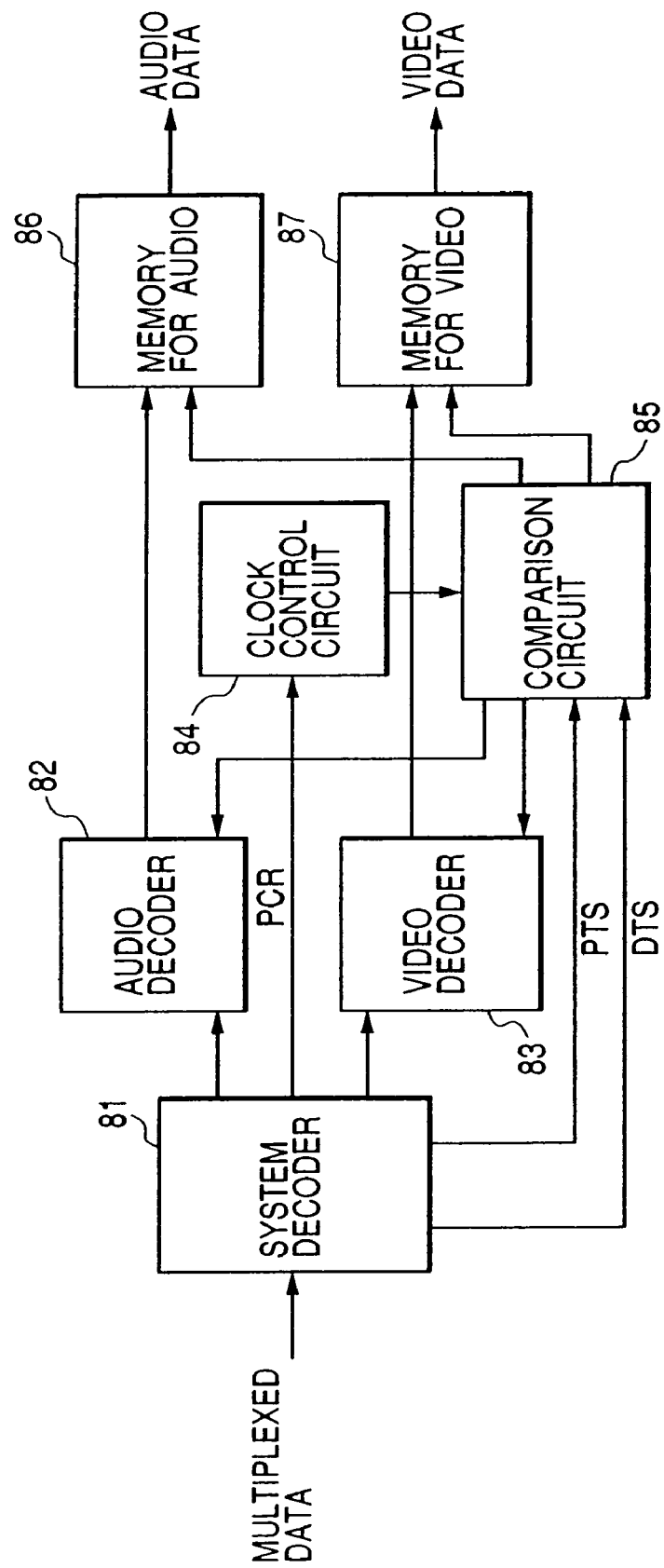
FIG. 4 is a block diagram of an MPEG-system decoding apparatus.

FIG. 4 shows an MPEG-system decoding apparatus which includes a system decoder 81 receiving multiplexing-resultant data (a system bit stream) containing video information and audio information. The system decoder 81 demultiplexes the received data into video data and audio data. The system decoder 81 outputs the audio data to an audio decoder (an MPEG audio decoder) 82. The system decoder 81 outputs the video data to a video decoder (an MPEG video decoder) 83. In addition, the system decoder 81 extracts every PCR, every video DTS, every audio DTS, every video PTS, and every audio PTS from the received data. The system decoder 81 may extract every SCR from the received data. The system decoder 81 outputs the PCR (or the SCR) to a clock control circuit 84. The system decoder 81 outputs the video DTS, the audio DTS, the video PTS, and the audio PTS to a comparison circuit 85.

The clock control circuit 84 includes an oscillator for generating a reference clock signal denoting reference clock time. The clock control circuit 84 locks the frequency of oscillation of the oscillator to a frequency indicated by the PCR. Therefore, the reference clock time is decided on the basis of the PCR. The clock control circuit 84 informs the comparison circuit 85 of reference clock time, that is, time denoted by the reference clock signal.

The comparison circuit 85 compares time denoted by the audio DTS with the reference clock time to decide whether or not the audio DTS time agrees with the reference clock time. When the audio DTS time agrees with the reference clock time, the comparison circuit 85 orders the audio decoder 82 to start the decoding of the audio data. The audio decoder 82 implements the decoding of the audio data. The audio decoder 82 stores the decoding-resultant audio data into a memory 86. The comparison circuit 85 compares time denoted by the video DTS with the reference clock time to decide whether or not the video DTS time agrees with the reference clock time. When the video DTS time agrees with the reference clock time, the comparison circuit 85 orders the video decoder 83 to start the decoding of the video data. The video decoder 83 implements the decoding of the video data. The video decoder 83 stores the decoding-resultant video data into a memory 87.

The comparison circuit 85 compares time denoted by the audio PTS with the reference clock time to decide whether or not the audio PTS time agrees with the reference clock time. When the audio PTS time agrees with the reference clock time, the comparison circuit 85 enables the memory 86 to output the decoding-resultant audio data for a playback purpose or a sound production purpose. The comparison circuit 85 compares time denoted by the video PTS with the reference clock time to decide whether or not the video PTS time agrees with the reference clock time. When the video PTS time agrees with the reference clock time, the comparison circuit 85 enables the memory 87 to output the decoding-resultant video data for an indication purpose. The video PTS and the audio PTS are preset so that the decoding-resultant video data and the decoding-resultant audio data can be synchronously outputted from the memories 86 and 87. Therefore, video information and audio information can be synchronously played back.

It is considered that a portion of the MPEG-system decoding apparatus of FIG. 4 corresponds to a virtual decoder for temporarily storing decoding-resultant data of plural types, and implementing synchronous reproduction of the plural-type data. The virtual decoder is referred to as an STD (system target decoder). A multiplexing-resultant bit stream is designed so that memories in the STD will neither overflow nor underflow.

The MPEG system standards prescribe a transport stream (TS) and a program stream (PS). The TS or the PS is formed by packetized elementary streams (PESs) and packets loaded with other information. The PESs are defined as intermediate streams for conversion or transformation between a TS and a PS. The PESs are generated by packeting, for example, encoding-resultant MPEG video data, encoding-resultant MPEG audio data, or a private stream.

Figure 5:
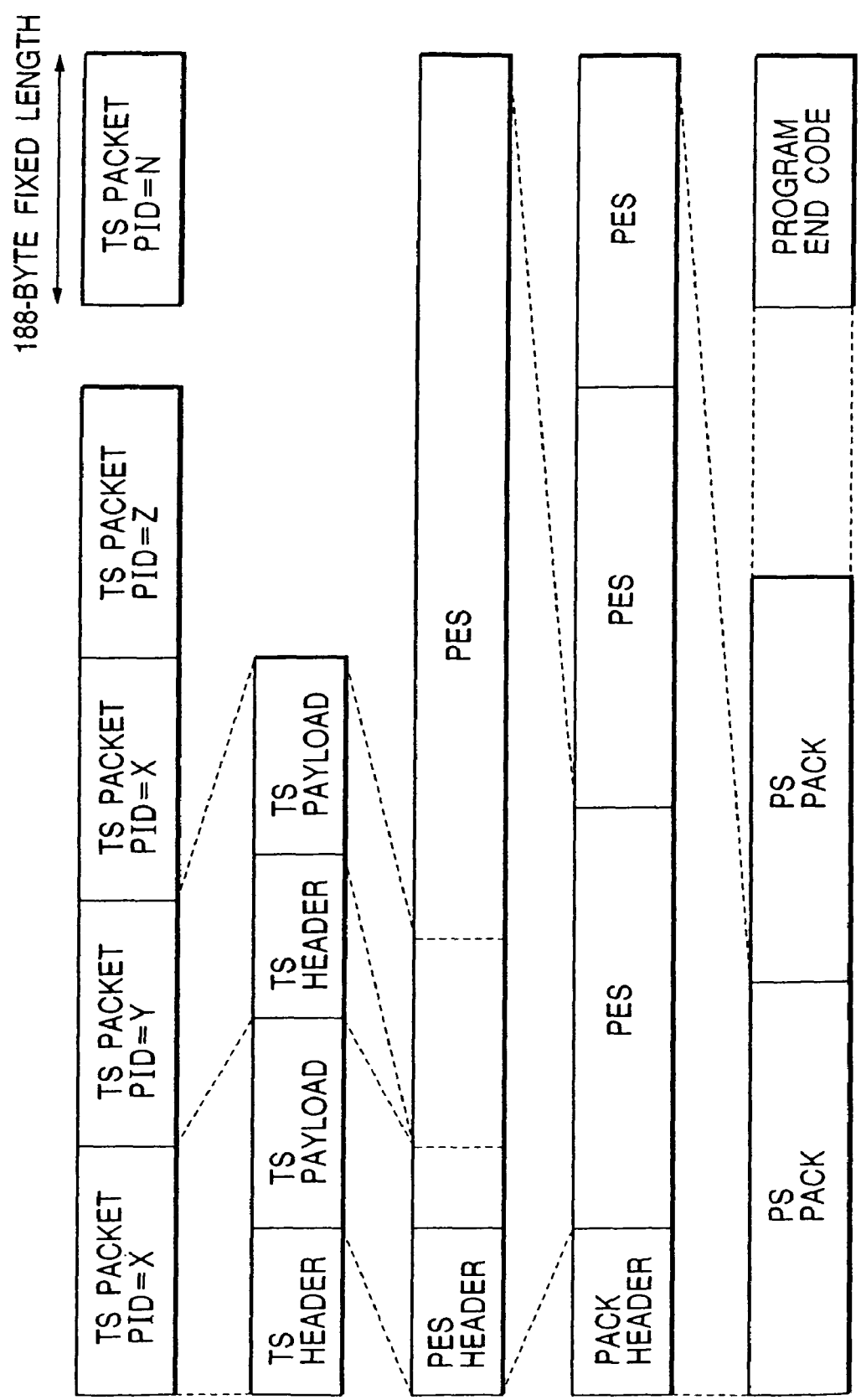
FIG. 5 is a diagram of the relation among an MPEG transport stream (TS), an MPEG program stream (PS), and packetized elementary streams (PESs).

Video and audio data of content programs having common reference time can be multiplexed into a PS. The PS includes a sequence of packets. A packet layer of the PS is called "PES". With reference to FIG. 5, the packet layer of the PS is common to that of a TS so that compatibility between the PS and the TS is provided. According to an STD model for a PS, the decoding mode for a bit stream to be decoded is switched to a PS side by a stream ID in a PES packet.

Video and audio data of content programs having common reference time can also be multiplexed into a TS. Furthermore, video and audio data of content programs different in reference time can be multiplexed into a TS. The TS is formed by a sequence of fixed-length packets, that is, 188-byte packets (TS packets). The TS is designed for use in a system where a data error or data errors are caused by a transmission line. As understood from the above explanation, the TS is a stream representing multiple content-programs. Although a TS packet ranks higher than a PES packet, the TS packet is normally shorter than the PES packet. Generally, one PES packet is divided into segments, and the PES packet segments are placed in plural TS packets respectively. According to an STD model for a TS, the decoding mode for a bit stream to be decoded is switched to a PS side by a packet ID (PID) in a TS packet.

Figure 6:
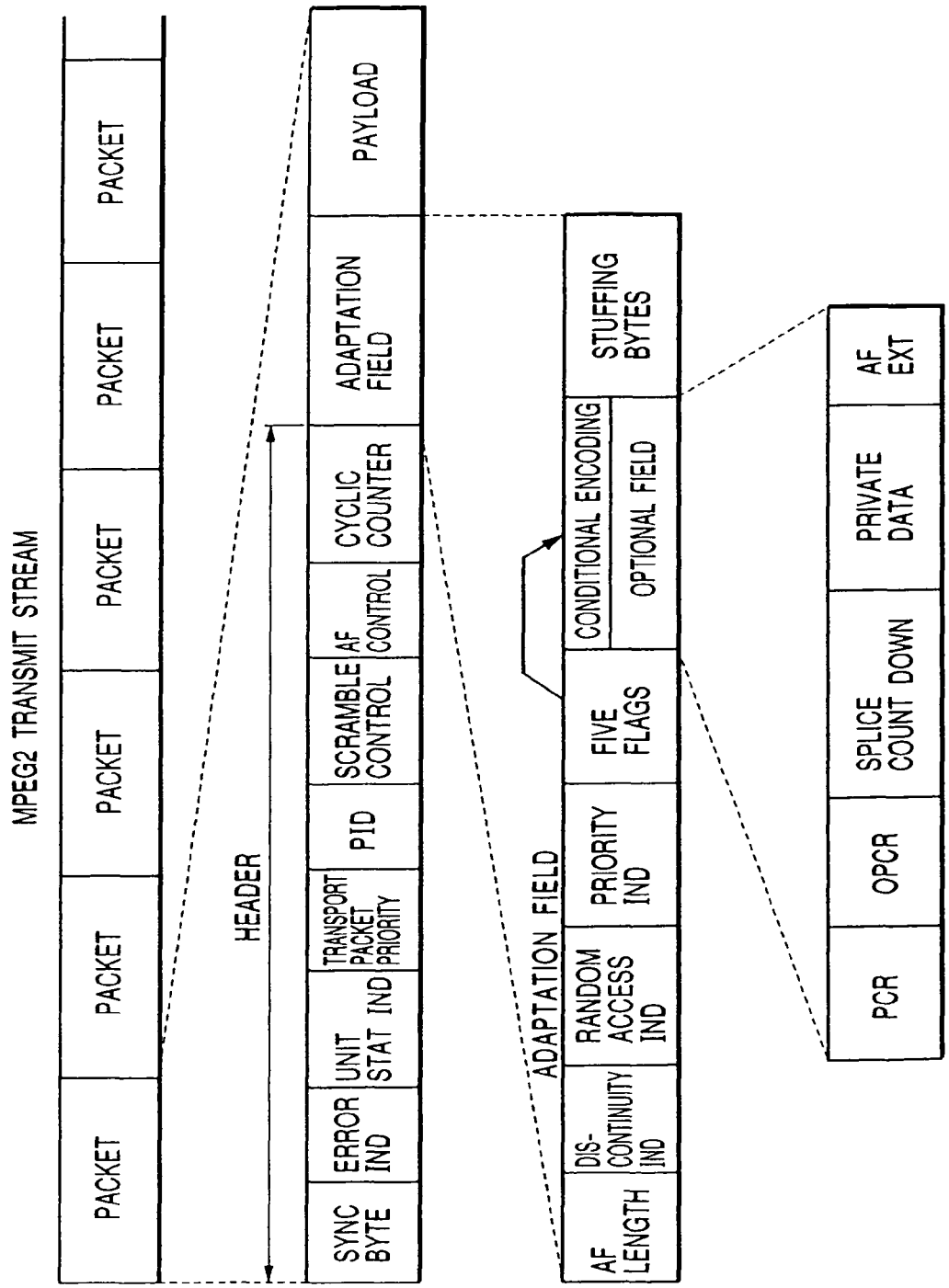
FIG. 6 is a diagram of the format of a TS packet.

With reference to FIG. 6, a TS packet has a header, an adaptation field (AF), and a payload which are sequentially arranged in that order. The header includes a sync byte, an error indicator, a unit start indicator, and a transport packet priority flag which are sequentially arranged in that order. In the header, the transport packet priority flag is followed by a PID which indicates the type of the payload in the related packet (the type of data in the payload in the related packet). In the header, the PID is successively followed by a scramble control information piece, an AF control information piece, and a cyclic counter. The tail of the header is occupied by the cyclic counter. The AF control information piece represents whether the adaptation filed (AF) is present in or absent from the related packet. When the AF control information piece represents the absence of the adaptation field, the header is immediately followed by the payload. On the other hand, when the AF control information piece represents the presence of the adaptation field, the header is successively followed by the adaptation field (AF) and the payload. The cyclic counter indicates the continuity about the related packet. In general, adaptation information is placed in the adaptation field (AF) while content data such as video data or audio data are placed in the payload. Ineffective data (dummy data) can be placed in the payload.

As shown in FIG. 6, the adaptation field includes an optional field. A 48-bit front end of the optional field is loaded with a PCR.

Figure 7:
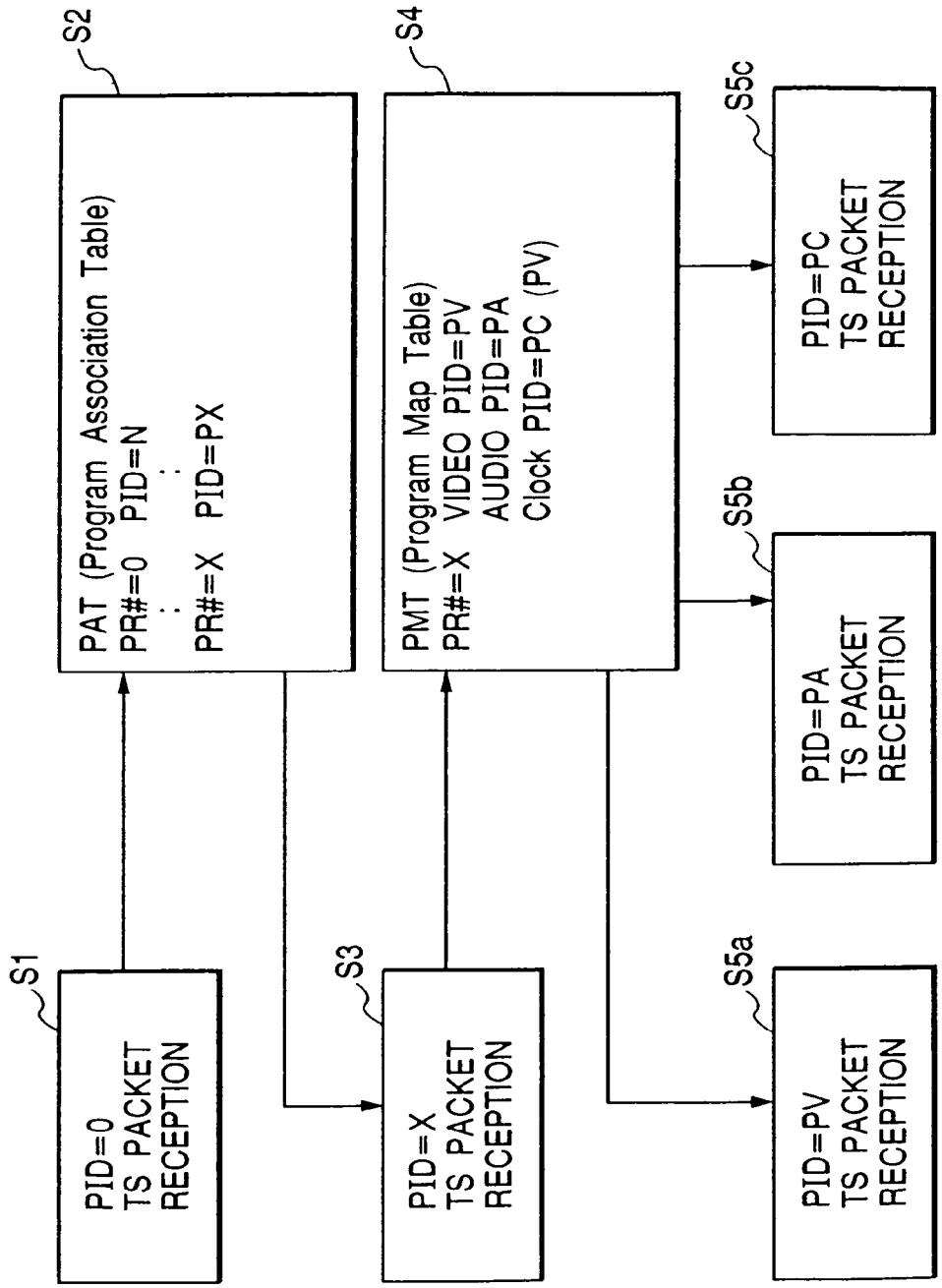
FIG. 7 is a flow diagram of the reception of TS packets in response to packet IDs (PIDs).

An MPEG-system decoding apparatus handling a TS is designed to provide a mechanism for detecting the PIDs in TS packets and classifying the TS packets according to the detected PIDs during reception and decoding procedures. Specifically, with reference to FIG. 7, TS packets are searched for one having a PID=0 at a stage S1. In other words, a TS packet having a PID=0 is received. The TS packet having a PID=0 is referred to as a PAT (program association table) packet. The PAT packet is loaded with PAT information representing the relation between program numbers (content-program ID numbers) PR and special PIDs on a link basis, that is, the relation between content programs and the special PIDs. At a stage S2 following the stage S1, the PAT information in the PAT packet is detected. Each of the special PIDs corresponds to a PMT (program map table) packet. The PMT packet is loaded with PMT information representing the relation among the related content program, PIDs in video packets representing the related content program, and PIDs in audio packets representing the related content program. One is selected in advance from content programs as a desired content program. At the stage S2, one of the special PIDs which corresponds to the desired content program is detected by referring to the PAT information in the PAT packet. At a stage S3 following the stage S2, a PMT packet having a PID identical with the detected special PID is received or searched for. At a stage S4 subsequent to the stage S3, the received PMT packet is accessed to get PMT information. According to the PMT information in the accessed PMT packet, PIDs in video packets and audio packets representing the desired content program are detected. In addition, PIDs in sync clock packets relating to the desired content program are detected. At a stage S5a following the stage S4, TS packets corresponding to the detected video packet PIDs are received. Video information is extracted from the received TS packets. At a stage S5b following the stage S4, TS packets corresponding to the detected audio packet PIDs are received. Audio information is extracted from the received TS packets. At a stage S5c following the stage S4, TS packets corresponding to the detected sync clock packet PIDs are received. Sync clock information is extracted from the received TS packets. In this way, the video packets and the audio packets representing the desired content program are accessed in response to the detected PIDs. Entry into the desired content program is implemented by referring to the PAT and the PMT. The PAT and the PMT are called PSI (program specific information).

Figure 8:
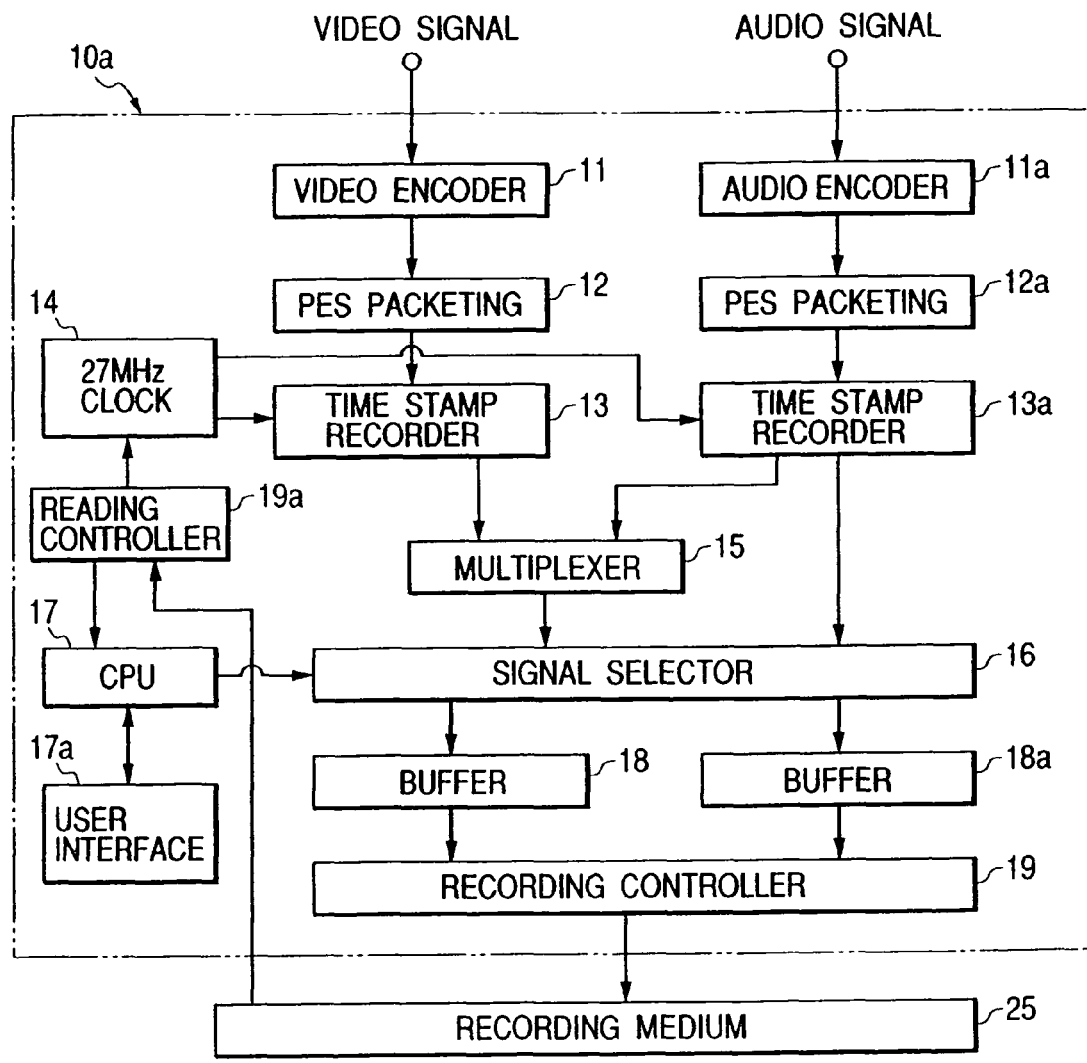
FIG. 8 is a block diagram of an information-signal recording apparatus in the first embodiment of this invention.

FIG. 8 shows an information-signal generating apparatus 10a which can be used as the information-signal generating apparatus 10 in FIG. 1. As shown in FIG. 8, the information-signal generating apparatus 10a includes a user interface 17a connected with a CPU 17. The user interface 17a can be handled by a user. The CPU 17 has a combination of an input/output port, a processing section, a ROM, and a RAM. The CPU 17 operates in accordance with a control program stored in the ROM or the RAM. The control program is designed to enable the CPU 17 to implement operation steps mentioned later. By handling the user interface 17a, operation of the information-signal generating apparatus 10a can be changed among different modes including a first mode and a second mode. The first operation mode is designed to record a complete package signal, that is, main data containing both audio information and video information. The second operation mode is designed to record after-recording-purpose audio data. When the user interface 17a is handled, an operation-mode designation signal is inputted therefrom into the CPU 17. The operation-mode designation signal indicates which of the first operation mode and the second operation mode is desired. The CPU 17 transfers the operation-mode designation signal to a signal selector 16.

When the operation-mode designation signal indicates that the first operation mode is desired, that is, when the recording of main data is desired, the information-signal generating apparatus 10a operates as follows. Input video data (a video signal) are fed to a video encoder 11, and input audio data (a first audio signal) accompanying the input video data are fed to an audio encoder 11a. The video encoder 11 and the audio encoder 11a are similar to those in FIG. 1. In general, the input video data and the input audio data represent a common content program (a common audio-visual program), and are synchronous with each other. The video encoder 11 implements the MPEG encoding of the input video data to generate encoding-resultant video data. The encoding-resultant video data are sent from the video encoder 11 to a PES packeting device 12. The audio encoder 11a implements the MPEG encoding of the input audio data to generate encoding-resultant audio data. The encoding-resultant audio data are sent from the audio encoder 11a to a PES packeting device 12a. The PES packeting device 12 converts the encoding-resultant video data into a sequence of PES packets. The PES packet sequence is sent from the PES packeting device 12 to a time stamp recorder 13. The PES packeting device 12a converts the encoding-resultant audio data into a sequence of PES packets. The PES packet sequence is sent from the PES packeting device 12a to a time stamp recorder 13a.

A signal generator 14 outputs a 27-MHz clock signal to the time stamp recorders 13 and 13a. The time stamp recorder 13 generates timing information pieces, that is, a PCR and periodically-updated time stamps (a video PTS and a video DTS), in response to the 27-MHz clock signal. The time stamp recorder 13 records the PCR, the PTS, and the DTS in each PES packet. Timing-information-added PES packets are sequentially sent from the time stamp recorder 13 to a multiplexer 15. The time stamp recorder 13a generates a PCR and periodically-updated time stamps (an audio PTS and an audio DTS) in response to the 27-MHz clock signal. The time stamp recorder 13a records the PCR, the PTS, and the DTS in each PES packet. Timing-information-added PES packets are sequentially sent from the time stamp recorder 13a to the multiplexer 15. The multiplexer 15 multiplexes the PES packets from the time stamp recorder 13 and the PES packets from the time stamp recorder 13a to generate multiplexing-resultant data (main data) of a PS form or a TS form. The multiplexing-resultant data are sent from the multiplexer 15 to the signal selector 16.

The signal selector 16 selects the multiplexing-resultant data (the main data) in response to the operation-mode designation signal, and passes the multiplexing-resultant data to a buffer 18. The multiplexing-resultant data are stored in the buffer 18 before being outputted therefrom to a recording controller 19. The recording controller 19 records the main data (the multiplexing-resultant data) on an information-signal recording medium 25 as an AV multiplexing-resultant file 25a having a name "PR . . . .dat" (see FIG. 10).

The video PTS and the video DTS recorded by the time stamp recorder 13, and the audio PTS and the audio DTS recorded by the time stamp recorder 13a are in a relation such that the video information and the audio information can be synchronously reproduced from the recorded main data.

When the operation-mode designation signal indicates that the second operation mode is desired, that is, when the recording of after-recording-purpose audio data is desired, the information-signal generating apparatus 10a operates as follows. The CPU 17 sends identification information (ID information) of after-recording-purpose audio data to the PES packeting device 12a. After-recording-purpose audio data (a second audio signal) are fed to the audio encoder 11a. The audio encoder 11a implements the MPEG encoding of the after-recording-purpose audio data to generate encoding-resultant audio data. The encoding-resultant audio data are sent from the audio encoder 11a to the PES packeting device 12a.

The PES packeting device 12a adds the after-recording ID information to the encoding-resultant audio data, and converts the ID-added encoding-resultant video data into a sequence of PES packets. The PES packet sequence is sent from the PES packeting device 12a to the time stamp recorder 13a.

An information-signal reproducing apparatus accesses the AV multiplexing-resultant file 25a on the recording medium 25, and reads out multiplexing-resultant data (main data) therefrom. The information-signal reproducing apparatus separates and reproduces a video signal from the read-out multiplexing-resultant data. Specifically, a reading controller 19a possessed in common by the information-signal generating apparatus 10a and the information-signal reproducing apparatus accesses the recording medium 25 and reproduces the video signal. Furthermore, the reading controller 19a extracts every PCR, every video PTS, and every video DTS from the reproduced video signal. Alternatively, the PCR, the video PTS, and the video DTS relating to the reproduced video signal may be obtained by an identification information detector in the information-signal reproducing apparatus. The reading controller 19a sends the extracted PCR to the signal generator 14. The reading controller 19a informs the CPU 17 of the extracted video PTS and the extracted video DTS. The signal generator 14 locks the 27-MHz clock signal to the frequency indicated by the extracted PCR.

The signal generator 14 outputs the 27-MHz clock signal to the time stamp recorder 13a. The time stamp recorder 13a generates timing-information pieces, that is, a PCR and periodically-updated time stamps (an audio PTS and an audio DTS), in response to the 27-MHz clock signal while being controlled by the CPU 17. The control of the time stamp recorder 13a by the CPU 17 implements management of the audio PTS and the audio DTS in response to the extracted video PTS and the extracted video DTS, thereby providing a synchronized relation between the audio information in the after-recording-purpose audio data and the video information in the recorded main data (the AV multiplexing-resultant file 25a). The time stamp recorder 13a records the PCR, the audio PTS, and the audio DTS in each PES packet. Preferably, the PCR, the audio PTS, and the audio DTS are set equal to those which have been added to each audio PES packet during the recording of the main data. In this case, the timing relation of the after-recorded audio data with the video information in the recorded main data will be the same as that of the audio information in the recorded main data with the video information therein. Timing-information-added PES packets are sequentially sent from the time stamp recorder 13a to the signal selector 16 without being propagated through the multiplexer 15. The signal selector 16 selects the data (the PES packet sequence) outputted by the time stamp recorder 13a in response to the operation-mode designation signal, and passes the selected data to a buffer 18a. The selected data are stored in the buffer 18a before being outputted therefrom to the recording controller 19. The recording controller 19 records the output data from the buffer 18a on the recording medium 25 as after-recorded audio data (post-recorded audio data). The after-recorded audio data on the recording medium 25 are in an after-recorded audio file 25b having a name "AF- . . . .dat" (see FIG. 10). Preferably, the recording medium 25 is alternately and periodically accessed by the recording controller 19 and the information-signal reproducing apparatus (the reading controller 19a) on a time sharing basis.

Similarly, third and later audio signals (second and later after-recording-purpose audio signals) may be recorded on the recording medium 25 as second and later after-recorded audio files respectively. For example, an after-recorded audio file containing an M-th after-recorded audio signal has a name "AF-M.dat".

According to an information format mentioned later, after-recording-purpose audio data are recorded on an information-signal recording medium 25 as play list information. Specifically, first after-recording-purpose audio data are recorded as a file having a name "AF-1.dat" in a PL folder (see FIG. 10). Also, second and later after-recording-purpose audio data are recorded. Furthermore, m-th after-recording-purpose audio data are recorded as a file having a name "AF-m.dat" in the PL folder (see FIG. 10). Thus, "m" different types of after-recording-purpose audio data are recorded. An information piece "AF_number" (see FIG. 15) identifies after-recording-purpose audio data. Since the information piece "AF_number" has 8 bits ("0" is unused), up to 254 different types of after-recording-purpose audio data can be handled.

Figure 9:
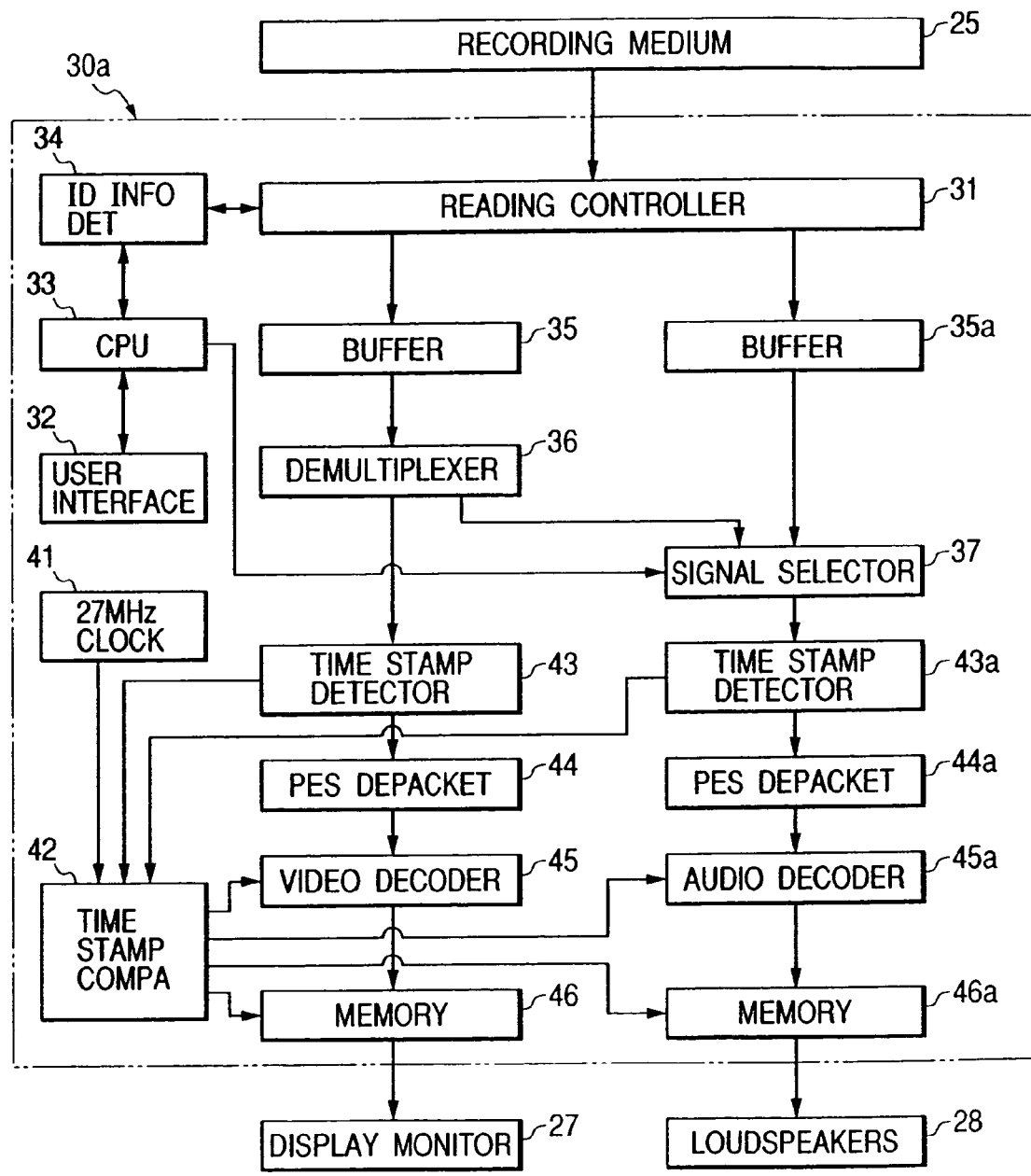
FIG. 9 is a block diagram of an information-signal reproducing apparatus in the first embodiment of this invention.

FIG. 9 shows an information-signal reproducing apparatus 30a which can be used as the information-signal reproducing apparatus 30 in FIG. 1. As shown in FIG. 9, the information-signal reproducing apparatus 30a includes a user interface 32 connected with a CPU 33. The user interface 32 can be handled by a user. The CPU 33 has a combination of an input/output port, a processing section, a ROM, and a RAM. The CPU 33 operates in accordance with a control program stored in the ROM or the RAM. The control program is designed to enable the CPU 33 to implement operation steps mentioned later. By handling the user interface 32, operation of the information-signal reproducing apparatus 30a can be changed among different modes including a first mode and a second mode. The first operation mode is designed to reproduce main data (an AV multiplexing-resultant file 25a). The second operation mode is designed to reproduce after-recorded audio data (an after-recorded audio file 25b) instead of audio information in main data while synchronously reproducing video information in the main data. When the user interface 32 is handled, an operation-mode designation signal is inputted therefrom into the CPU 33. The operation-mode designation signal indicates which of the first operation mode and the second operation mode is desired. The CPU 33 transfers the operation-mode designation signal to a signal selector 37. Also, identification (ID) information can be inputted into the CPU 33 by handling the user interface 32. The CPU 33 transfers the identification information to an identification information detector 34.

When the operation-mode designation signal indicates that the first operation mode is desired, that is, when the reproduction of main data (an AV multiplexing-resultant file 25a) is desired, the information-signal reproducing apparatus 30a operates as follows. A signal for identifying desired main data is inputted into the CPU 33 by handling the user interface 32. The identifying signal represents the designation number (the identification number) assigned to the desired main data. The CPU 33 transfers the identifying signal to the identification information detector 34. The identification information detector 34 derives the identification number of the desired main data from the identifying signal. The identification information detector 34 notifies a reading controller 31 of the identification number of the desired main data. The identification information detector 34 orders the reading controller 31 to read out, from an information-signal recording medium 25, a main-data file (an AV multiplexing-resultant file 25a) having a name "PR . . . .dat" corresponding to the identification number of the desired main data. Thus, the reading controller 31 implements the read-out of the desired main data from the recording medium 25. In this way, the reading controller 31 reads out desired main data, that is, desired multiplexing-resultant data, from the recording medium 25. The read-out main data are sent from the reading controller 31 to a buffer 35. The main data are stored in the buffer before being outputted therefrom to a demultiplexer 36. The demultiplexer 36 separates the main data into video data and audio data. The video data are sent from the demultiplexer 36 to a time stamp detector 43. The audio data are sent from the demultiplexer 36 to the signal selector 37. The signal selector 37 selects the audio data from the demultiplexer 36 in response to the operation-mode designation signal, and passes the selected audio data to a time stamp detector 43a.

The time stamp detector 43 detects timing information (every PCR, every video PTS, and every video DTS) in the video data. The time stamp detector 43 sends the detected PCR, the detected video PTS, and the detected video DTS to a time stamp comparator 42. The time stamp detector 43 passes the video data to a PES de-packeting device 44. The time stamp detector 43a detects timing information (every PCR, every audio PTS, and every audio DTS) in the audio data. The time stamp detector 43a sends the detected PCR, the detected audio PTS, and the detected audio DTS to the time stamp comparator 42. The time stamp detector 43a passes the audio data to a PES de-packeting device 44a.

The PES de-packeting device 44 de-packets the video data (a sequence of PES packets) to generate de-packeting-resultant video data. The PES de-packeting device 44 outputs the de-packeting-resultant video data to a video decoder 45. The PES de-packeting device 44a de-packets the audio data (a sequence of PES packets) to generate de-packeting-resultant audio data. The PES de-packeting device 44a outputs the de-packeting-resultant audio data to an audio decoder 45a. The video decoder 45 and the audio decoder 45a are similar to those in FIG. 1. The video decoder 45 implements the MPEG decoding of the video data to generate decoding-resultant video data. The video decoder 45 stores the decoding-resultant video data into a memory 46. The audio decoder 45a implements the MPEG decoding of the audio data to generate decoding-resultant audio data. The audio decoder 45a stores the decoding-resultant audio data into a memory 46a.

A signal generator 41 outputs a 27-MHz clock signal to the time stamp comparator 42. On the basis of the 27-MHz clock signal, the time stamp comparator 42 generates a reference clock signal denoting reference clock time. The time stamp comparator 42 locks the frequency of the reference clock signal to a frequency indicated by the PCR. Therefore, the reference clock time is decided by the PCR. The time stamp comparator 42 compares time denoted by the video DTS with the reference clock time to decide whether or not the video DTS time agrees with the reference clock time. When the video DTS time agrees with the reference clock time, the time stamp comparator 42 orders the video decoder 45 to start the decoding of the video data originating from the PES packet having the related video DTS. The time stamp comparator 42 compares time denoted by the audio DTS with the reference clock time to decide whether or not the audio DTS time agrees with the reference clock time. When the audio DTS time agrees with the reference clock time, the time stamp comparator 42 orders the audio decoder 45a to start the decoding of the audio data originating from the PES packet having the related audio DTS.

The time stamp comparator 42 compares time denoted by the video PTS with the reference clock time to decide whether or not the video PTS time agrees with the reference clock time. When the video PTS time agrees with the reference clock time, the time stamp comparator 42 orders the memory 46 to output the decoding-resultant video data to a display monitor 27 for an indication purpose. The time stamp comparator 42 compares time denoted by the audio PTS with the reference clock time to decide whether or not the audio PTS time agrees with the reference clock time. When the audio PTS time agrees with the reference clock time, the time stamp comparator 42 orders the memory 46a to output the decoding-resultant audio data to loudspeakers 28 for a playback purpose or a sound production purpose. The video PTS and the audio PTS are preset so that the decoding-resultant video data and the decoding-resultant audio data can be synchronously played back.

When the operation-mode designation signal indicates that the second operation mode is desired, that is, when the reproduction of after-recorded audio data and main-data video information is desired, the information-signal reproducing apparatus 30a operates as follows. Signals for identifying desired main data and desired after-recorded audio data are inputted into the CPU 33 by handling the user interface 32. The identifying signals correspond to information pieces "PR_number" and "AF_number" in FIG. 15 which represent the designation numbers (the identification numbers) assigned to the desired main data and the desired after-recorded audio data. The CPU 33 transfers the identifying signals to the identification information detector 34. The reading controller 31 reads out play list information "PLAYL_IFO" (see FIG. 15) from an information-signal recording medium 25, and sends the play list information "PLAYL_IFO" to the identification information detector 34. The identification information detector 34 detects the identification numbers of the desired main data and the desired after-recorded audio data in response to the identifying signals by referring to the play list information "PLAYL_IFO". The identification information detector 34 notifies the reading controller 31 of the identification numbers of the desired main data and the desired after-recorded audio data. The identification information detector 34 orders the reading controller 31 to alternately read out, from the recording medium 25, a main-data file (an AV multiplexing-resultant file 25a) and an after-recorded audio file 25b having names corresponding to the identification numbers of the desired main data and the desired after-recorded audio data. Thus, the reading controller 31 implements the read-out of the desired main data and the desired after-recorded audio data from the recording medium 25 on an alternate time-sharing burst basis. The read-out main data are sent from the reading controller 31 to the buffer 35. The main data are stored in the buffer 35 before being outputted therefrom to the demultiplexer 36. The demultiplexer 36 separates the main data into video data and audio data. The video data are sent from the demultiplexer 36 to the time stamp detector 43. The audio data are sent from the demultiplexer 36 to the signal selector 37. The read-out after-recorded audio data are sent from the reading controller 31 to the buffer 35a. The after-recorded audio data are stored in the buffer 35a before being outputted therefrom to the signal selector 37. The signal selector 37 selects the after-recorded audio data from the buffer 35a in response to the operation-mode designation signal, and passes the selected after-recorded audio data to the time stamp detector 43a. In other words, the signal selector 37 rejects the audio data from the demultiplexer 36.

The time stamp detector 43 detects timing information (every PCR, every video PTS, and every video DTS) in the video data. The time stamp detector 43 sends the detected PCR, the detected video PTS, and the detected video DTS to the time stamp comparator 42.

The time stamp detector 43 passes the video data to the PES de-packeting device 44. The time stamp detector 43a detects timing information (every PCR, every audio PTS, and every audio DTS) in the after-recorded audio data. The time stamp detector 43a sends the detected PCR, the detected audio PTS, and the detected audio DTS to the time stamp comparator 42. The time stamp detector 43a passes the after-recorded audio data to the PES de-packeting device 44a.

The PES de-packeting device 44 de-packets the video data (a sequence of PES packets) to generate de-packeting-resultant video data. The PES de-packeting device 44 outputs the de-packeting-resultant video data to the video decoder 45. The PES de-packeting device 44a de-packets the after-recorded audio data (a sequence of PES packets) to generate de-packeting-resultant audio data. The PES de-packeting device 44a outputs the de-packeting-resultant audio data to the audio decoder 45a. The video decoder 45 implements the MPEG decoding of the video data to generate decoding-resultant video data. The video decoder 45 stores the decoding-resultant video data into the memory 46. The audio decoder 45a implements the MPEG decoding of the audio data to generate decoding-resultant audio data. The audio decoder 45a stores the decoding-resultant audio data into the memory 46a.

The signal generator 41 outputs the 27-MHz clock signal to the time stamp comparator 42. On the basis of the 27-MHz clock signal, the time stamp comparator 42 generates a reference clock signal denoting reference clock time. The time stamp comparator 42 locks the frequency of the reference clock signal to a frequency indicated by the PCR. Therefore, the reference clock time is decided by the PCR. The time stamp comparator 42 compares time denoted by the video DTS with the reference clock time to decide whether or not the video DTS time agrees with the reference clock time. When the video DTS time agrees with the reference clock time, the time stamp comparator 42 orders the video decoder 45 to start the decoding of the video data originating from the PES packet having the related video DTS. The time stamp comparator 42 compares time denoted by the audio DTS with the reference clock time to decide whether or not the audio DTS time agrees with the reference clock time. When the audio DTS time agrees with the reference clock time, the time stamp comparator 42 orders the audio decoder 45a to start the decoding of the audio data originating from the PES packet having the related audio DTS.

The time stamp comparator 42 compares time denoted by the video PTS with the reference clock time to decide whether or not the video PTS time agrees with the reference clock time. When the video PTS time agrees with the reference clock time, the time stamp comparator 42 orders the memory 46 to output the decoding-resultant video data to the display monitor 27 for an indication purpose. The time stamp comparator 42 compares time denoted by the audio PTS with the reference clock time to decide whether or not the audio PTS time agrees with the reference clock time. When the audio PTS time agrees with the reference clock time, the time stamp comparator 42 starts the memory 46a to output the decoding-resultant audio data to the loudspeakers 28 for a playback purpose or a sound production purpose. The video PTS and the audio PTS are preset so that the decoding-resultant video data and the decoding-resultant audio data (the after-recorded audio data) can be synchronously played back.

Figure 10:
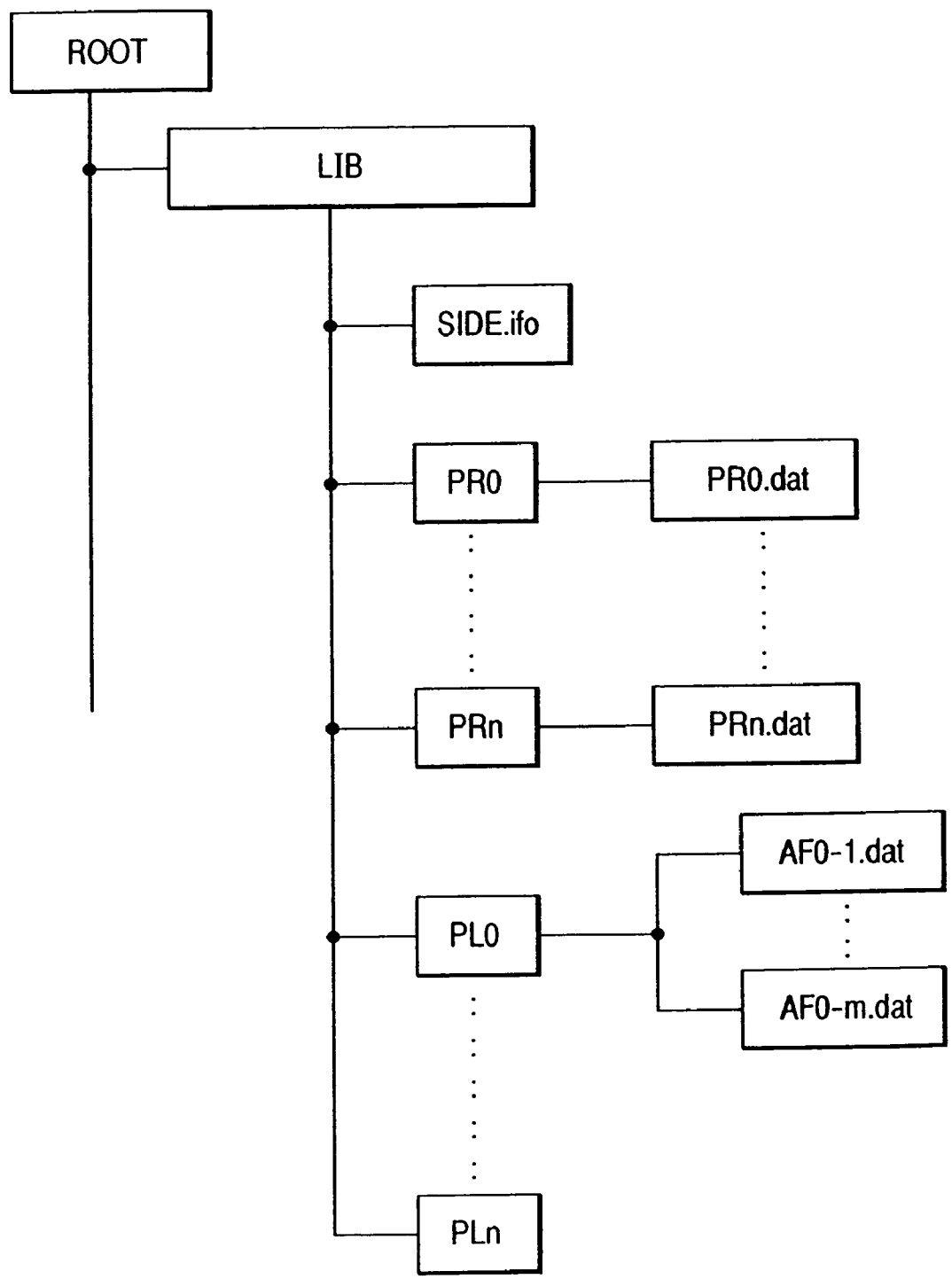
FIG. 10 is a diagram of the file structure of information recorded on an information-signal recording medium.

The format of information recorded on an information-signal recording medium 25 will be explained below. As shown in FIG. 10, the recording medium 25 stores a ROOT directory under which a folder named "LIB (library)" is placed. Under the folder "LIB", there are a plurality of files named "SIDE.ifo" ("SIDE0.ifo", "SIDE1.ifo", . . . , and "SIDEk.ifo"). The files "SIDE.ifo" are loaded with side information relating to a plurality of content programs, that is, audio-visual (AV) programs.

In addition, under the folder "LIB", there are folders "PR0", "PR1", . . . , and "PRn" loaded with information pieces "PR0.dat", "PR1.dat", and "PRn.dat", respectively. The information pieces "PR0.dat", "PR1.dat", and "PRn.dat" are designed for link with AV multiplexing-resultant bit streams.

Furthermore, under the folder "LIB", there are folders "PL0", "PL1", . . . , and "PLn" for containing after-recorded audio files (files loaded with after-recorded audio information). For example, in the case where "m" after-recorded audio files relating to the folder "PR0" are made and recorded, list information pieces "AF0-1.dat", "AF0-2.dat", . . . , "AF0-m.dat" are placed in the folder "PL0" as information for link with the after-recorded audio files.

As understood from the above description, link information relating to AV multiplexing-resultant files and after-recorded audio files is recorded on the recording medium 25. Desired content information can be reproduced from the recording medium 25 on the basis of the link information.

Figures 11, 12:
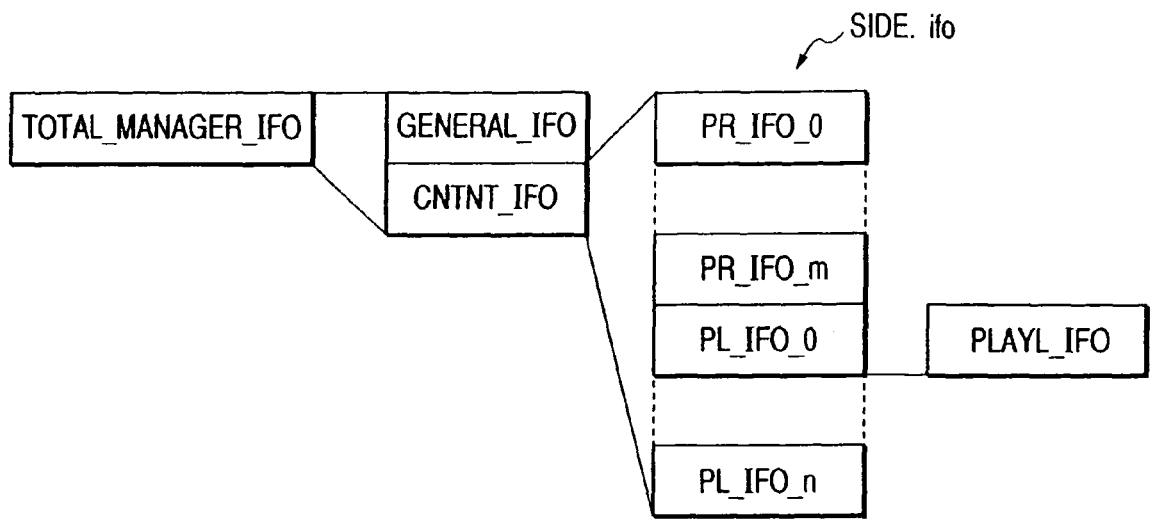
FIG. 11 is a diagram of the structure of a file "SIDE.ifo" in FIG. 10.
FIG. 12 is a diagram of the syntax structure of a second-level segment "GENERAL_IFO" in FIG. 11.

With reference to FIG. 11, each file "SIDE.ifo" is in a format having a hierarchical structure. Specifically, each file "SIDE.ifo" has a first-level segment "TOTAL_MANAGER_IFO" containing second-level segments "GENERAL_IFO" and "CNTNT_IFO". The second-level segment "GENERAL_IFO" is loaded with parameters relating to the whole of the present side information.

The second-level segment "GENERAL_IFO" is of a syntax structure shown in FIG. 12. Specifically, the second-level segment "GENERAL_IFO" includes information pieces having syntax names "System_id", "TMG_IFO_length", "Num of PR_IFO", "Num of PL_IFO", "Start Address of PR_IFO", and "Start Address of PL-IFO", respectively. The information piece "System¯id" is a 32-bit signal representing the type of the present information structure. The information piece "TMG_IFO_length" is a 32-bit signal representing the whole manager length. The information piece "Num of PR_IFO" is an 8-bit signal representing the number of program information pieces "PR_IFO" which will be explained later. The information piece "Num of PL_IFO" is an 8-bit signal representing the number of after-recorded information pieces "PL_IFO" which will be explained later. The information piece "Start Address of PR_IFO" is a 32-bit signal representing the head address of a first program information piece "PR_IFO_0". The information piece "Start Address of PL_IFO" is a 32-bit signal representing the head address of a first after-recorded information piece "PL_IFO_0".

The second-level segment "CNTNT_IFO" in FIG. 11 contains third-level segments "PR_IFO_0", "PR_IFO_1", ..., and "PR_IFO_m" loaded with information pieces which relate to content programs (or AV multiplexing-resultant files) respectively. Furthermore, the second-level segment "CNTNT_IFO" contains third-level segments "PL_IFO_0", "PL_IFO_1", ..., and "PL_IFO_n" loaded with information pieces for after-recorded audio data which relate to the content programs (or the AV multiplexing-resultant files) respectively. For example, in the case where after-recorded audio data corresponding to the third-level segment "PR_IFO_0" are present, the third-level segment "PL-IFO_0" contains a fourth-level segment "PLAYL_IFO" loaded with information (play list information) relating to the after-recorded audio file.

Figures 13, 14:
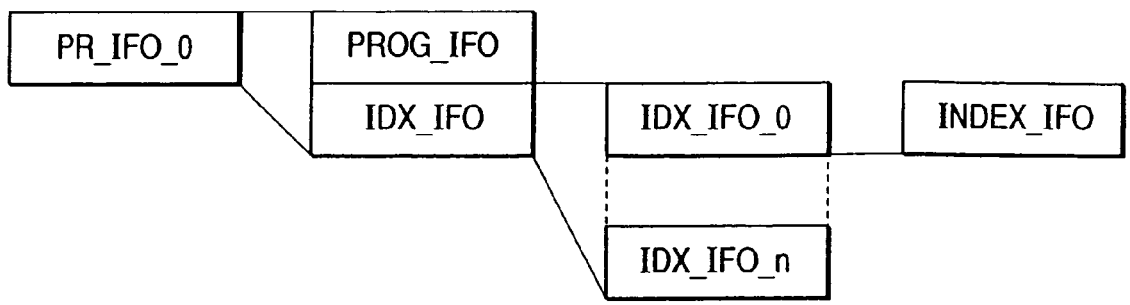
FIG. 13 is a diagram of the structure of a third-level segment "PR_IFO_0" in FIG. 11.
FIG. 14 is a diagram of the syntax structure of a fourth-level segment "PROG_IFO" in FIG. 13.

The third-level segments "PR_IFO_0", "PR_IFO_1", ..., and "PR_IFO_m" are similar in structure. Only the third-level segment "PR_IFO_0" will be explained in more detail. As shown in FIG. 13, the third-level segment "PR_IFO_0" contains fourth-level segments "PROG_IFO" and "IDX_IFO". The fourth-level segment "PROG_IFO" is loaded with content-program-related information. The fourth-level segment "IDX_IFO" contains fifth-level segments "IDX_IFO_0", "IDX_IFO_1", ..., and "IDX_IFO_n" loaded with information pieces which relate to respective indexes of the related audio-visual program. The fifth-level segments "IDX_ IFO_0", "IDX_IFO_1", ..., and "IDX_IFO_n" are similar in structure. For example, the fifth-level segment "IDX_ IFO_0" has a sixth-level segment "INDEX_IFO" in which a portion of the related audio-visual program can be registered as index information.

The fourth-level segment "PROG_IFO" is of a syntax structure shown in FIG. 14. Specifically, each fourth-level segment "PROG_IFO" includes information pieces having syntax names "Size of PROG_IFO", "PR number", "Content type", and "Component type", respectively. The information piece "Size of PROG_IFO" is a 32-bit signal representing the size of the present fourth-level segment "PROG_IFO". The information piece "PR number" is an 8-bit signal representing the designation number (the identification number) assigned to the related audio-visual program. The PR number is variable among "0"-"255" corresponding to different audio-visual programs respectively. The information piece "Content type" is an 8-bit signal representing the type of the related audio-visual program. The information piece "Component type" is an 8-bit signal representing the type of related data, that is, representing whether related data are of video, audio, or other.

As previously mentioned, in the presence of an after-recorded audio file, play list information "PLAYL_IFO" is provided. In the presence of "m" after-recorded audio files corresponding to the folder "PR0", list information pieces "AF0-1.dat", "AF0-2.dat", ..., "AF0-m.dat" are placed in the folder "PL0" as information for link with the after-recorded audio files.

The play list information "PLAYL_IFO" is of a syntax structure shown in FIG. 15. Specifically, the play list information "PLAYL_IFO" includes information pieces having syntax names "PR_number" and "AF_number" respectively. The information piece "PR_number" is an 8-bit signal representing the designation number (the identification number) assigned to the related main data, that is, the related audio-visual program. The information piece "AF_number" is an 8-bit signal representing the designation number (the identification number) assigned to the related after-recorded audio data.

Regarding each of "n+1" AV multiplexing-resultant streams "PRj.dat (j=0, 1, ..., n)" in the folders "PRj" of FIG. 10, "m" after-recorded audio data can be registered in accordance with user's request. When the number "m" is equal to "0", an AV multiplexing-resultant file is used without employing after-recorded audio data. When the number "m" is equal to "1" or greater, the recording of after-recording-purpose audio data is permitted. In this case, at least one after-recorded audio file is made and recorded. Also, the after-recorded audio data are reproduced or transmitted.

The index information "INDEX_IFO" in FIG. 13 is of a syntax structure in FIG. 16. Specifically, the index information "INDEX_IFO" includes information pieces having syntax names "INDEX number", "Playback Time", "Start Address", and "End Address", respectively. The information piece "INDEX number" is an 8-bit signal representing the serial number assigned to the related index. The information piece "Playback Time" is a 40-bit signal representing the playback time of the related index. The information piece "Start Address" is a 64-bit signal representing the address of the starting point of the related index. The information piece "End Address" is a 64-bit signal representing the address of the ending point of the related index.

In this way, side information shown in FIG. 10 is designed. Recording information of files relating to folders "PR" and "PL" and list information pieces "AF" are generated on the basis of the side information. Prescribed AV and audio files are recorded on the recording medium 25 by referring to the recording information. Designated AV and audio files are read out from the recording medium 25 by referring to the recording information. Accordingly, a video signal accompanied with a desired audio signal can be played back while the desired audio signal is reproduced.

The recording medium 25 includes, for example, a DVD-RAM, a DVD-RW, a DVD-R, a magneto-optical disk, or a hard disk. As previously mentioned, during the recording of after-recording-purpose audio data on the recording medium 25, main data are read out from the recording medium 25. The recording of the after-recording-purpose audio data and the read-out of the main data are alternately implemented on a time sharing basis at periods each corresponding to a plurality of packets. Preferably, the after-recording-purpose audio data are recorded on a surface of the recording medium 25 where the main data are also recorded.

Figure 17:
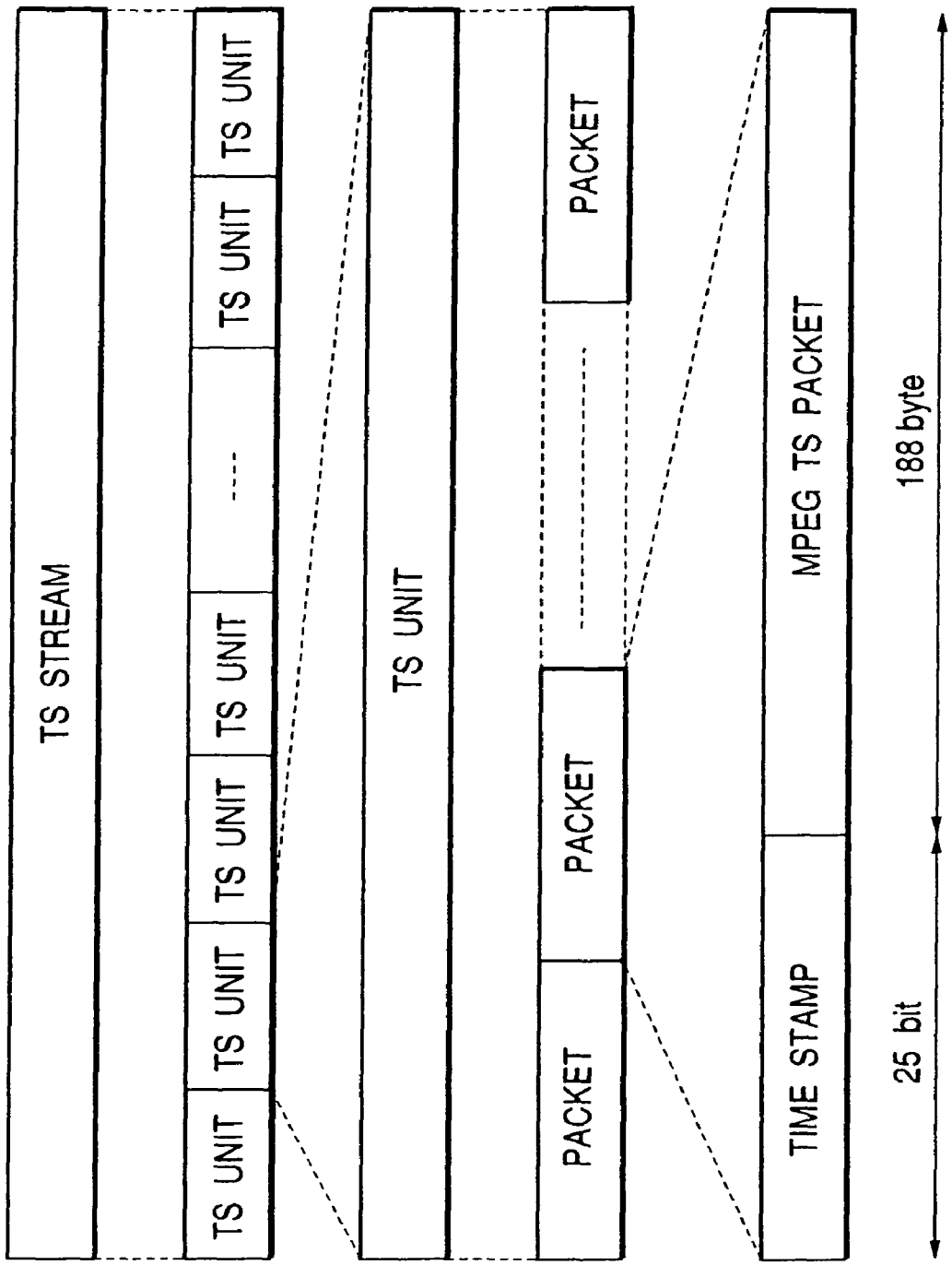
FIG. 17 is a diagram of the format of a transport stream (TS) recorded on a hard disk.

FIG. 17 shows the format of a TS recorded on a hard disk which constitutes the recording medium 25. As shown in FIG. 17, the TS is formed by a sequence of TS units. Each TS unit is composed of packets. Each packet is composed of a 25-bit time stamp and a 188-byte MPEG TS packet. The MPEG TS packet is identical with a TS packet in FIG. 5. In the case where audio data in an AV multiplexing-resultant file 25_a_ are replaced by audio data (after-recorded audio data) in an after-recorded audio file 25_b_, the synchronized relation between the after-recorded audio data and the video data in the AV multiplexing-resultant file 25_a_ can be maintained since a sync-providing time stamp is added to each TS packet.

Figure 18:
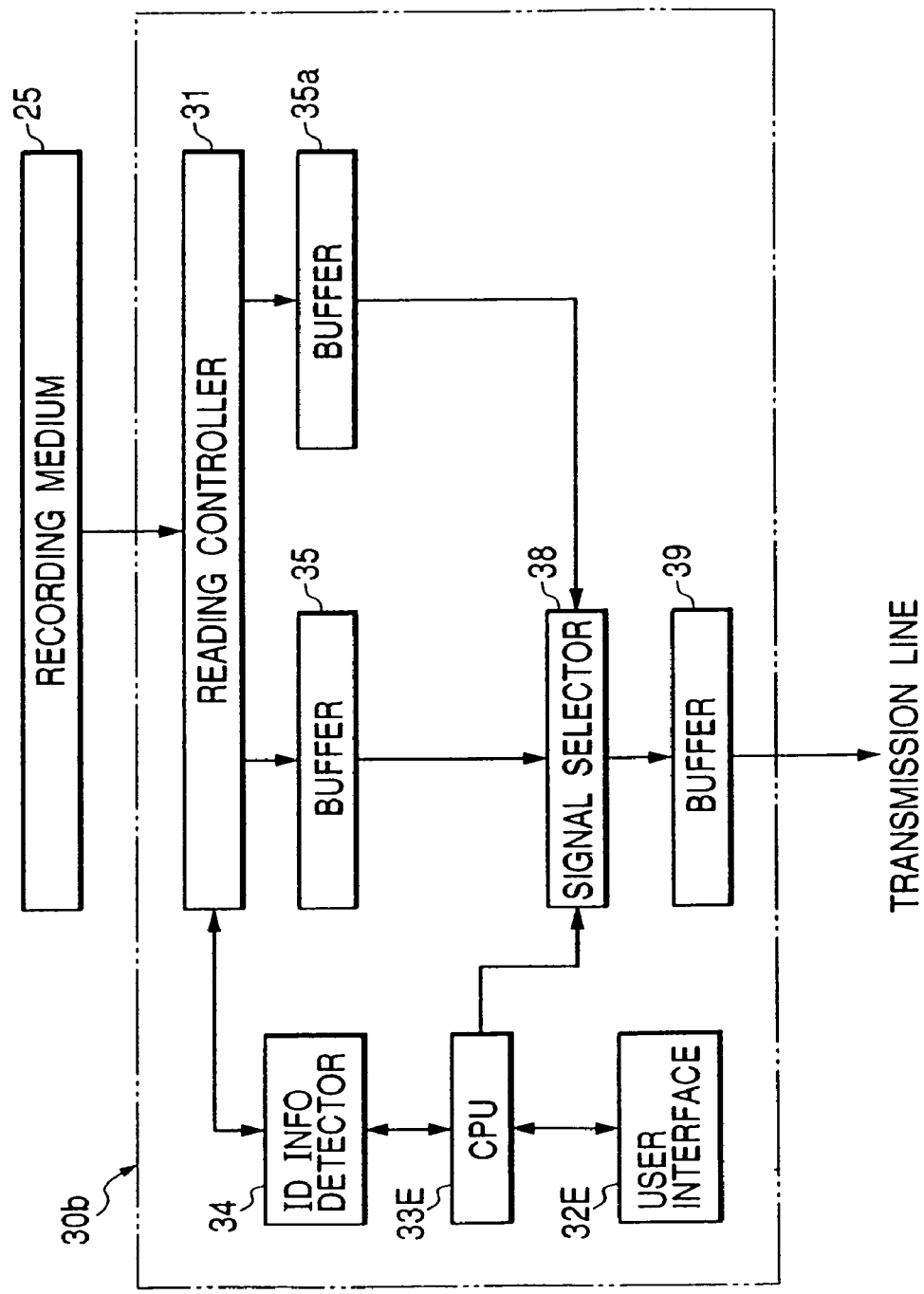
FIG. 18 is a block diagram of an information-signal transmission apparatus in the first embodiment of this invention.

FIG. 18 shows an information-signal transmission apparatus 30_b_. As shown in FIG. 18, the transmission apparatus 30_b_ includes a user interface 32E connected with a CPU 33E. The user interface 32E can be handled by a user. The CPU 33E has a combination of an input/output port, a processing section, a ROM, and a RAM. The CPU 33E operates in accordance with a control program stored in the ROM or the RAM. The control program is designed to enable the CPU 33E to implement operation steps mentioned later. By handling the user interface 32E, operation of the transmission apparatus 30b can be changed among different modes including a first mode and a second mode. The first operation mode is designed to transmit main data (an AV multiplexing-resultant file 25a). The second operation mode is designed to transmit after-recorded audio data (an after-recorded audio file 25b) instead of audio information in main data while transmitting video information in the main data. When the user interface 32E is handled, an operation-mode designation signal is inputted therefrom into the CPU 33E. An operation-mode designation signal may be sent to the CPU 33E from an information-signal reception apparatus which is located at a position remote from the transmission apparatus 30b. The operation-mode designation signal indicates which of the first operation mode and the second operation mode is desired. The CPU 33E transfers the operation-mode designation signal to a signal selector 38 which can also be operated as a packet selector. Furthermore, identification (ID) information can be inputted into the CPU 33E by handling the user interface 32E. Identification information may be sent to the CPU 33E from the reception apparatus. The CPU 33E transfers the identification information to an identification information detector 34.

When the operation-mode designation signal indicates that the first operation mode is desired, that is, when the transmission of main data (an AV multiplexing-resultant file 25a) is desired, the transmission apparatus 30b operates as follows. A reading controller 31 reads out main data, that is, AV multiplexing-resultant data, from an information-signal recording medium 25. The read-out main data are sent from the reading controller 31 to a buffer 35. The main data are stored in the buffer 35 before being outputted therefrom to the signal selector 38. The signal selector 38 selects the main data from the buffer 35 in response to the operation-mode designation signal, and passes the main data to a buffer 39. The main data are stored in the buffer 39 before being outputted therefrom to a transmission line. The main data (the AV multiplexing-resultant data) are propagated to the reception apparatus along the transmission line. The reception apparatus synchronously plays back audio information and video information in the main data.

When the operation-mode designation signal indicates that the second operation mode is desired, that is, when the transmission of after-recorded audio data and main-data video information is desired, the transmission apparatus 30b operates as follows. Signals for identifying desired main data and desired after-recorded audio data are inputted into the CPU 33E by handling the user interface 32E. The identifying signals may be sent to the CPU 33E from the reception apparatus. The identifying signals correspond to information pieces "PR_number" and "AF_number" in FIG. 15 which represent the designation numbers (the identification numbers) assigned to the desired main data and the desired after-recorded audio data. The CPU 33E transfers the identifying signals to the identification information detector 34. The reading controller 31 reads out play list information "PLAYL_IFO" from an information-signal recording medium 25. The reading controller 31 sends the play list information "PLAYL_IFO" to the identification information detector 34. The identification information detector 34 detects the identification numbers of the desired main data and the desired after-recorded audio data in response to the identifying signals by referring to the play list information "PLAYL_IFO" (see FIG. 15). The identification information detector 34 notifies the reading controller 31 of the identification numbers of the desired main data and the desired after-recorded audio data. The identification information detector 34 orders the reading controller 31 to alternately read out, from the recording medium 25, a main-data file (an AV multiplexing-resultant file 25a) and an after-recorded audio file 25b having names corresponding to the identification numbers of the desired main data and the desired after-recorded audio data. Thus, the reading controller 31 implements the read-out of the desired main data and the desired after-recorded audio data from the recording medium 25 on an alternate time-sharing burst basis. The read-out main data are sent from the reading controller 31 to the buffer 35. The main data are stored in the buffer 35 before being outputted therefrom to the signal selector 38. The read-out after-recorded audio data are sent from the reading controller 31 to a buffer 35a. The after-recorded audio data are stored in the buffer 35a before being outputted therefrom to the signal selector 38. The signal selector (the packet selector) 38 replaces audio data in the main data with the after-recorded audio data from the buffer 35a in response to the operation-mode designation signal, and thereby converts the original main data into new main data (new AV multiplexing-resultant data). The signal selector 38 implements the audio-data replacement on a packet-by-packet basis (an element-by-element basis). The new main data are sent from the signal selector 38 to the buffer 39. The new main data are stored in the buffer 39 before being outputted therefrom to the transmission line. The new main data (the new AV multiplexing-resultant data) are propagated to the reception apparatus along the transmission line. The reception apparatus synchronously plays back audio information and video information in the main data. During the conversion of the original main data into the new main data, it is unnecessary to alter every PCR, every DTS, and every PTS. Preferably, the signal selector 38 includes a calculator. The calculator may be formed by the CPU 33E. For packets of the new main data which have been subjected to the audio-data replacement, the calculator computes new CRC (cyclic redundancy check) code words and replaces old CRC code words with the new ones.

FIG. 19 is a flowchart of a segment of the control program for the CPU 33E. As shown in FIG. 19, a first step S11 controls the reading controller 31 to read out main data (an AV multiplexing-resultant file 25a) from an information-signal recording medium 25.

A step S12 following the step S11 decides whether or not audio information in the read-out main data is required to be replaced with after-recorded audio information. When audio information in the read-out main data is required to be replaced with after-recorded audio information, the program advances from the step S12 to a step S13. Otherwise, the program jumps from the step S12 to a step S17.

The step S13 controls the identification information detector 34 and the reading controller 31 to read out, from the recording medium 25, an after-recorded audio file 25b (after-recorded audio data) having a name corresponding to a designated identification number.

A step S14 subsequent to the step S13 divides the read-out AV multiplexing-resultant file 25a and the read-out after-recorded audio file 25b, that is, the read-out main data and the read-out after-recorded audio data, into packets (elements).

A step S15 following the step S14 replaces audio data in the read-out main data with the read-out after-recorded audio data equal in playback timing to the former audio data on a packet-by-packet basis. Thereby, the step S15 converts the original main data into new main data (a new AV multiplexing-resultant file).

A step S16 subsequent to the step S15 computes new CRC (cyclic redundancy check) code words and replaces old CRC code words with the new ones for packets of the new main data which have been subjected to the audio-data replacement. Thus, the step S16 generates CRC-code-revised main data (a CRC-code-revised AV multiplexing-resultant file). After the step S16, the program advances to the step S17.

The step S17 transmits either the AV multiplexing-resultant file given by the step S11 or the AV multiplexing-resultant file given by the step S16 to a transmission line.

A step S18 following the step S17 decides whether or not the transmission of the AV multiplexing-resultant file has been completed. When the transmission of the AV multiplexing-resultant file has not yet been completed, the program returns from the step S18 to the step S11. In this case, the step S11 and the later steps are repeated. On the other hand, when the transmission of the AV multiplexing-resultant file has been completed, the program exits from the step S18 and then the current execution of the program segment ends. The step S18 may also respond to a transmission-halt request. In this case, upon the reception of a transmission-halt request, the program exits from the step S18 and then the current execution of the program segment ends regardless of whether or not the transmission of the AV multiplexing-resultant file has been completed.

As previously mentioned, AV multiplexing-resultant data which conform to the MPEG system standards are recorded on or reproduced from an information-signal recording medium. The AV multiplexing-resultant data contain audio information and video information accompanied with the audio information. Furthermore, after-recording-purpose audio data which conform to the MPEG system standards are recorded on and reproduced from the recording medium. The after-recording-purpose audio data have a synchronized relation with the video information in the AV multiplexing-resultant data. The after-recording-purpose audio data and the video information in the AV multiplexing-resultant data are synchronously played back. The AV multiplexing-resultant data can be transmitted from the recording medium toward an information-signal reception apparatus via a transmission line. Also, the after-recording-purpose audio data and the video information in the AV multiplexing-resultant data which compose new AV multiplexing-resultant data can be transmitted from the recording medium toward the reception apparatus via the transmission line.

As previously mentioned, an audio signal and a video signal are compressively encoded. The encoding-resultant data are divided into unit blocks (packets). A time stamp for audio-video synchronous playback is added to each unit block. The time-stamp-added data are recorded on an information-signal recording medium.

A video signal and a first audio signal are compressively encoded and multiplexed into main data, and the main data are recorded on an information-signal recording medium. A second audio signal, that is, an after-recording-purpose audio signal, is compressively encoded into after-recording-purpose audio data. The after-recording-purpose audio data are recorded on the recording medium without being multiplexed with the video data in the main data.

Therefore, simple signal processing enables after-recording-purpose audio data to be recorded on an information-signal recording medium. In addition, a plurality of after-recording-purpose audio signals accompanying same video information can be recorded on the recording medium. Each of the after-recording-purpose audio signals can be played back synchronously with the video information. As previously mentioned, a first audio signal and a video signal are multiplexed before being recorded on an information-signal recording medium as an AV multiplexing-resultant file. During playback, the first audio signal in the AV multiplexing-resultant file can be replaced with each of after-recording-purpose audio signals.

Timing information added to after-recording-purpose audio data is composed of a PCR, a DTS, and a PTS generated on the basis of main data. It should be noted that a PCR, a DTS, and a PTS for after-recording-purpose audio data may be generated independently of main data.

Information for getting a reference timing may be placed in a header of timing information in after-recording-purpose audio data. In this case, the playback of the after-recording-purpose audio data is optimized according to the reference-timing information.

Audio information accompanying video information may be replaced by character information to be indicated on a multiplexed basis for a commentary, figure information, picture information different from the video information, auxiliary information relating to an indication area of the video information, or other information to be played back synchronously with the video information.

As understood from the previous description, regarding the generation of main data, it is supposed that a data piece related to the type of after-recording-purpose audio data is previously produced in element data, and that the transmission rate of the after-recording-purpose audio data is equal to that of original audio data in the main data.

As previously mentioned, a video signal is compressively encoded into an encoding-resultant video signal. A first audio signal which accompanies the video signal is compressively encoded into a first encoding-resultant audio signal. The encoding-resultant video signal and the first encoding-resultant audio signal are multiplexed into a multiplexing-resultant signal to which timing information indicative of decoding timings and playback timings are added. The multiplexing-resultant signal is recorded on an information-signal recording medium. A second audio signal (an after-recording-purpose audio signal) which has a synchronized relation with the video signal is compressively encoded into a second encoding-resultant audio signal to which timing information for the synchronization with the video signal is added. The second encoding-resultant audio signal is recorded on the recording medium. Thereafter, the second audio signal and the video signal in the multiplexing-resultant signal are synchronously reproduced. The second encoding-resultant audio signal is equivalent in timing to the first encoding-resultant audio signal. Thus, during the reproduction of the second audio signal, the decoding of the second encoding-resultant audio signal is prevented from causing a trouble.

A first multiplexing-resultant signal is defined as an original data stream containing the compressively-encoded versions of a first audio signal and a video signal. The first audio signal accompanies the video signal. A second multiplexing-resultant signal is defined as a data stream containing the compressively-encoded versions of a second audio signal (an after-recording-purpose audio signal) and the video signal. The second audio signal accompanies the video signal. Although the second multiplexing-resultant signal is not generated in fact, an AV signal composed of the second audio signal and the video signal can be played back. Since the second multiplexing-resultant signal is neither generated nor recorded, the first multiplexing-resultant signal recorded on an information-signal recording medium can be prevented from being erased by the recording of the second multiplexing-resultant signal. Since the second multiplexing-resultant signal is not recorded, the usable capacity of the recording medium is prevented from being reduced by the second multiplexing-resultant signal.

A plurality of after-recording-purpose audio signals can be recorded on an information-signal recording medium. During playback, a user can select one from the after-recording-purpose audio signals. In this case, the selected after-recording-purpose audio signal and a video signal accompanied therewith are synchronously reproduced. Furthermore, the storage capacity of the recording medium can be efficiently used.

The compressively encoding of a video signal and an audio signal is accorded with the MPEG1 standards or the MPEG2 standards. The generation of an AV multiplexing-resultant signal is accorded with the MPEG system standards. An AV multiplexing-resultant signal may contain video information representing a music program and audio information representing karaoke music in the music program. In an AV multiplexing-resultant signal, audio information may be replaced by second video information to be played back synchronously with main video information.

The compressively encoding and the systematizing (the multiplexing) are accorded with the MPEG1 standards, the MPEG2 standards, and the MPEG4 standards. The compressively encoding and the systematizing (the multiplexing) may be based on a fractal encoding procedure or another encoding procedure in which the signal processing for playback is implemented while an encoding-resultant signal is temporarily stored in a prescribed recording area.

The information-signal recording medium 25 includes, for example, a hard disk or a DVD-RAM. The recording medium 25 may be of another type which has a random access performance enabling two different information files to be alternately read out, and which has a storage capacity enough to record a prescribed amount of digital video data.

A signal produced by the information-signal generating apparatus 10 or 10a is recorded on the information-signal recording medium 25. The information-signal reproducing apparatus 30 or 30a reproduces the recorded signal from the recording medium 25. The reproduced signal can be transmitted by the information-signal transmission apparatus 30b. Generally, the recording medium 25 is connected with the information-signal generating apparatus 10 or 10a, the information-signal reproducing apparatus 30 or 30a, and the information-signal transmission apparatus 30b in a manner such that signals can be directly transferred thereamong. Alternatively, the recording medium 25 may be connected with the information-signal generating apparatus 10 or 10a, the information-signal reproducing apparatus 30 or 30a, and the information-signal transmission apparatus 30b via a communication means such as a communication network.

Second Embodiment

A second embodiment of this invention is similar to the first embodiment thereof except for design changes mentioned later. According to the first embodiment of this invention, regarding the generation of main data, it is supposed that a data piece related to the type of after-recording-purpose audio data is previously produced in element data, and that the transmission rate of the after-recording-purpose audio data is equal to that of original audio data in the main data. According to the second embodiment of this invention, regarding the generation of main data, element data equal in transmission rate to expected after-recording-purpose audio data are previously recorded on a multiplexed basis as dummy data.

Third Embodiment

A third embodiment of this invention is similar to the first embodiment thereof except for design changes mentioned later. According to the third embodiment of this invention, in the case where after-recording-purpose audio data are expected to be recorded, element data equal in transmission rate to the expected after-recording-purpose audio data are previously recorded on a multiplexed basis as dummy data. When actual after-recording-purpose audio data are generated, the previously-recorded dummy data are replaced with the actual after-recording-purpose audio data. During the replacement of the previously-recorded dummy data with the actual after-recording-purpose audio data, it is unnecessary to alter every PCR, every DTS, and every PTS.

In the case where the transmission rate of actual after-recording-purpose audio data differs from the expected transmission rate, video data and the actual after-recording-purpose audio data are recorded on a multiplexed basis. In this case, it is necessary to renew every PCR, every DTS, and every PTS.

Advantages Provided by Embodiments

The first, second, and third embodiments of this invention provide the following advantages.

A video signal, a first audio signal, and timing information for synchronous reproduction of video and audio are multiplexed into an AV multiplexing-resultant signal to be recorded. In addition, a compressively-encoded version of a second audio signal which is synchronous with the video signal is supplied as a signal to be recorded. A reproducing side can reproduce an AV signal composed of the video signal and the second audio signal accompanying the video signal without being supplied with an AV multiplexing-resultant signal containing the video signal and the compressively-encoded version of the second audio signal.

An AV multiplexing-resultant signal is a stream of packets to which timing information is added. Also, a compressively-encoded version of a second audio signal is a stream of packets to which timing information is added. Therefore, management of timings is easy. A reproducing side can reproduce an AV signal composed of the video signal and the second audio signal accompanying the video signal.

A plurality of second audio signals to which identification signals are added are defined as substitution signals. During playback, one can be selected from the second audio signals, and the selected second audio signal can be reproduced.

A video signal, a first audio signal, and timing information for synchronous reproduction of video and audio are multiplexed into an AV multiplexing-resultant signal. A compressively-encoded version of a second audio signal has a synchronized relation with the video signal. The AV multiplexing-resultant signal and the compressively-encoded version of the second audio signal are reproduced, and the video signal is reproduced from the AV multiplexing-resultant signal. The reproduced video signal and the reproduced compressively-encoded version of the second audio signal are supplied as reproduced output signals synchronous with each other.

One is selected from compressively-encoded versions of second audio signals to which identification signals are added. The selected compressively-encoded version of the second audio signal can be supplied as a reproduced output signal having a synchronized relation with a video signal.

A video signal, a first audio signal, and timing information for synchronous reproduction of video and audio are multiplexed into an AV multiplexing-resultant signal. A compressively-encoded version of a second audio signal has a synchronized relation with the video signal. The AV multiplexing-resultant signal and the compressively-encoded version of the second audio signal are reproduced, and the video signal is reproduced from the AV multiplexing-resultant signal. The reproduced video signal and the reproduced compressively-encoded version of the second audio signal are multiplexed into a new AV multiplexing-resultant signal. The new AV multiplexing-resultant signal is transmitted to a reproducing side via a transmission line.

What is claimed is:

1. A method of reproducing an information signal, comprising the steps of:
reproducing an audio-visual multiplexing-resultant signal generated by multiplexing (1) a compressively-encoding-resultant video signal resulting from compressively encoding a video signal, (2) a first compressively-encoding-resultant audio signal resulting from compressively encoding a first audio signal having a synchronized relation with the video signal, (3) a reference clock information signal relating to synchronization between the compressively-encoding-resultant video signal and the first compressively-encoding-resultant audio signal, and (4) an indication timing information signal based on the reference clock information signal;
reproducing the video signal from the reproduced audio-visual multiplexing-resultant signal;
reproducing a substitution playback audio signal to reproduce a second audio signal, the substitution playback audio signal being generated in a signal generation side by (1) compressively encoding the second audio signal to get a second compressively-encoding-resultant audio signal, and (2) adding a sound-production-timing information signal to the second compressively-encoding-resultant audio signal, the sound-production-timing information signal designating a sound production timing of the second compressively-encoding-resultant audio signal, wherein a play list is generated from the audio-visual multiplexing-resultant signal and is linked with the substitution playback audio signal in the signal generation side;
deriving the reference clock information signal and the indication timing information signal from the reproduced audio-visual multiplexing-resultant signal;
deriving the compressively-encoding-resultant video signal from the reproduced audio-visual multiplexing-resultant signal;
decoding the derived compressively-encoding-resultant video signal to get a decoding-resultant video signal;
supplying the decoding-resultant video signal as an output video signal in response to the derived reference clock information signal and the derived indication timing information signal;
deriving the sound-production-timing information signal and the second audio signal from the reproduced substitution playback audio signal;
supplying the derived second audio signal instead of audio data in the reproduced audio-visual multiplexing-resultant signal as an output audio signal in response to the derived reference clock information signal and the derived sound-production-timing information signal;
comparing the reference clock information signal and the indication timing information signal to get a comparison result; and
supplying the video signal as an indication-purpose signal in accordance with the comparison result.

2. A method as recited in claim 1, wherein the substitution playback audio signal comprises a plurality of subordinate substitution playback audio signals which result from compressively encoding source audio signals respectively, and different identification signals are added to the subordinate substitution playback audio signals respectively, and wherein one of the source audio signals is selected by referring to the identification signals, and the selected source audio signal and the video signal are supplied as output reproduced signals synchronous with each other.

* * * * *